US007363531B2

(12) United States Patent  (10) Patent No.: US 7,363,531 B2
Vecoven  (45) Date of Patent: Apr. 22, 2008

(54) DATA SYNCHRONIZATION FOR SYSTEM CONTROLLERS

(75) Inventor: Frederic Louis Ghislain Gabriel Vecoven, Angleur (BE)

(73) Assignee: Sun Microsystems, Inc., Santa Clara, CA (US)

( * ) Notice: Subject to any disclaimer, the term of this patent is extended or adjusted under 35 U.S.C. 154(b) by 654 days.

(21) Appl. No.: 10/448,731

(22) Filed: May 30, 2003

(65) Prior Publication Data

US 2004/0255187 A1    Dec. 16, 2004

(51) Int. Cl.
*G06F 11/00* (2006.01)
(52) U.S. Cl. .......................................... 714/6
(58) Field of Classification Search ............... 714/6
See application file for complete search history.

(56) References Cited

U.S. PATENT DOCUMENTS

| 5,276,860 | A | * | 1/1994 | Fortier et al. ................ 714/6 |
| 5,649,089 | A | * | 7/1997 | Kilner ........................ 714/6 |
| 6,401,178 | B1 | * | 6/2002 | Gagne et al. ............... 711/162 |
| 6,452,809 | B1 | | 9/2002 | Jackson et al. |
| 6,556,438 | B1 | | 4/2003 | Bolognia et al. |
| 6,583,989 | B1 | | 6/2003 | Guyer et al. |
| 7,117,323 | B1 | * | 10/2006 | Delaney ..................... 711/162 |
| 7,120,823 | B2 | * | 10/2006 | Foster et al. ................ 714/6 |
| 2003/0101304 | A1 | | 5/2003 | King |

OTHER PUBLICATIONS

"Checksum" "Hash" "EPROM" "Flash Memory" "Server" Microsoft Computer Dicitonary. Copyright 2002. Microsoft Press.*

* cited by examiner

*Primary Examiner*—Robert Beausoliel
*Assistant Examiner*—Philip Guyton
(74) *Attorney, Agent, or Firm*—Meyertons Hood Kivlin Kowert & Goetzel, P.C.

(57) ABSTRACT

A system controller module is operable to monitor system operation in a system that can include a further such system controller module. The system controller module can include system controller storage and can be operable to maintain system parameters therein. At least a predetermined part of the system controller storage can include a plurality of domains. A check code (e.g., a pseudo CRC) can be generated for each domain such that equivalence between check codes for a domain in the system controller storage and a corresponding domain in further storage of a further system controller module is indicative of the domains concerned being in synchronism.

25 Claims, 18 Drawing Sheets

DATA SYNCHRONIZATION FOR SYSTEM CONTROLLERS

BACKGROUND OF THE INVENTION

The present invention relates to a method and apparatus for facilitating hardware fault management in a computer system, for example a computer server system.

It is known to provide a service controller in a computer system, for example a computer server system. The service controller can be implemented as a microprocessor, a microcontroller, special purpose logic, etc, separate from the main system processor(s) and is responsible for monitoring and reporting on system operation. The service controller can be responsible, for example, for monitoring environmental conditions (temperature, etc) in the computer system. In addition, or alternatively, the system controller can be responsible for monitoring the system configuration and/or operation. This can include, for example, monitoring and configuring the hardware and software present in the system, for example where the system can include field replaceable units (FRUs). The system controller can also be responsible for monitoring the status of system resources, for example the health of the FRUs, voltage supply levels, fan operating parameters, etc.

In order to increase the reliability of computer systems, for example computer server systems, it is known to provide redundant components, so that if one component fails another like component can take over the functions of the failed component. For example, it is proposed to provide redundant service controllers. As each service controller needs to maintain a record of at the least current system information, there is a need to ensure that the respective records are the same. The process of making them the same is generally termed synchronization. However, the synchronization of the stored system information can involve transferring significant quantities of data.

Accordingly, there is a need for an efficient way of maintaining and synchronizing such system information for a computer system comprising redundant system controllers.

SUMMARY OF THE INVENTION

The present invention provides a computer system and a method of operating a computer system that can enable efficient data synchronization for multiple system controllers.

One aspect of the present invention provides a computer system, for example a computer server, with first and second system controllers, each associated with respective first and second storage for storing system information. At least a predetermined part of each of the first and second storage can be divided into a respective plurality of domains. A check code can be provided for each domain and a correspondence between the check codes for respective domains in the first and second storage can be indicative of the domains being synchronized. In the event that a discrepancy is found between the check codes for the corresponding domains in the respective first and second storage, then the domain concerned can be synchronized in the first and second storage. In this manner the need to synchronize the whole of the predetermined part of the storage for system parameters can be avoided.

The predetermined part of each of the first and second storage can be a part for holding non-volatile configuration information, for example in the form of sequential key/value pairs for a hash table. The predetermined part of each of the first and second storage can be held in a respective storage device, for example a flash programmable read only memory.

As well as the predetermined part, each of the first and second storage can include a non-volatile memory part that is relatively small and can be synchronized in its entirety when required. Each of the first and second storage can further include a random access memory part. Each of the first and second system controllers can maintain a count of each time its random access memory part is updated. The respective counts can be compared, and if there is a discrepancy, then it is determined that synchronization between the random access memory parts is needed.

The check code can be, for example, a pseudo cyclic redundancy code, for example by exclusive-oring the cyclic redundancy codes of each entry in the predetermined part of the storage. The predetermined part of each of the first and second storage can be divided into a first domain for a system platform and a further domain for each operating instance supported on the system platform, for example into five domains in total. The check code is held in the domain concerned.

Another aspect of the invention provides a method of maintaining synchronization between redundant first and second storage, each of the first and second storage holding system information for a computer system and being associated with a respective system controller for the computer system. The method can include: dividing at least a predetermined part of each of the first and second storage into a corresponding plurality of domains; computing a redundancy check code for each of the domains; comparing the redundancy check code for each corresponding domain to check for synchronization between the first and second storage; and for each domain not found to be in synchronization, performing synchronization of that domain in the first and second storage.

A further aspect of the present invention provides a system controller module operable to monitor system operation in a system that can include a further such system controller module. The system controller module can include system controller storage and can be operable to maintain system parameters therein. At least a predetermined part of the system controller storage can include a plurality of domains. A check code (e.g., a pseudo CRC) can be generated for each domain such that equivalence between check codes for a domain in the system controller storage and a corresponding domain in further storage of a further system controller module is indicative of the domains concerned being in synchronism.

BRIEF DESCRIPTION OF THE DRAWINGS

Embodiments of the present invention will be described hereinafter, by way of example only, with reference to the accompanying drawings in which like reference signs relate to like elements and in which:

FIG. 15 is a schematic representative of two system controllers as shown in

FIG. 9, with only selected elements from FIG. 9 being illustrated in FIG. 15;

Figure 1A:
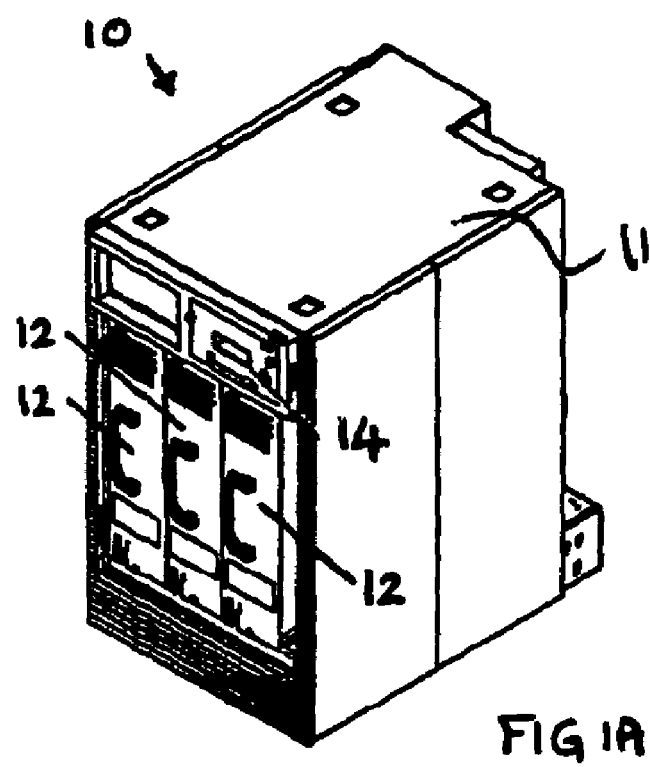
FIG. 1, formed from FIGS. 1A and 1B is a schematic illustration of a first computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, it is envisaged that combinations of features from the independent claims with features of dependent claims other than as presented by the dependencies of the claims, and also with features from the description, is also envisaged.

DESCRIPTION OF PARTICULAR EMBODIMENTS

Examples of the present invention will be described hereinafter with reference with to the accompanying drawings.

Figure 1B:
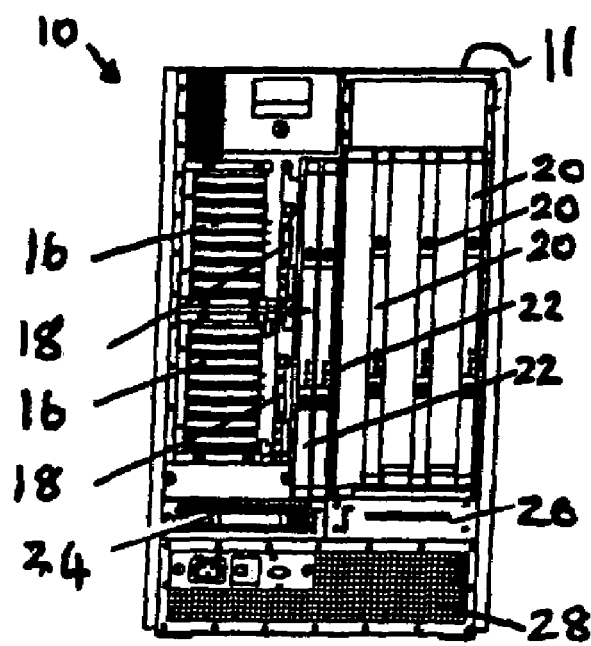

FIG. 1, which is made up of FIGS. 1A and 1B illustrates one example of a highly available, flexible stand-alone or rack-mountable computer server system. FIG. 1A is a perspective view generally from the front of the server 10 and FIG. 1B is a view from the rear of the server 10.

The server illustrated in FIG. 1 comprises a number of field-replaceable units (FRUs), which are mountable within a chassis 11. The FRUs are all modules that can be replaced in the field.

In the example shown in FIG. 1, these modules include up to three system boards 20, which are receivable in the rear face of the chassis 11. Using the system boards, support can be provided, for example, for between 2 and 12 processors and up to 192 Gbytes of memory. Two further modules in the form of I/O boards 16 are also receivable in the rear face of the chassis 11, the I/O boards 16 being configurable to support various combinations of I/O cards, for example Personal Computer Interconnect (PCI) cards, which also form FRUs.

Also mountable in the rear face of the chassis 11 are FRU modules in the form of system controller boards 18 and switch interconnect boards 22. The switch interconnect boards 22 are also known as repeater boards. First and second fan tray FRU modules 24 and 26 are also receivable in the rear face of the chassis 11. A further component of the rear face of the chassis 11 is formed by a power grid 28 to which an external power connection can be made.

Three power supply FRU modules 12 can be provided to provide N+1 DC power redundancy. A further fan tray FRU module 14 is receivable in the front face of the chassis 11.

Figure 2A:
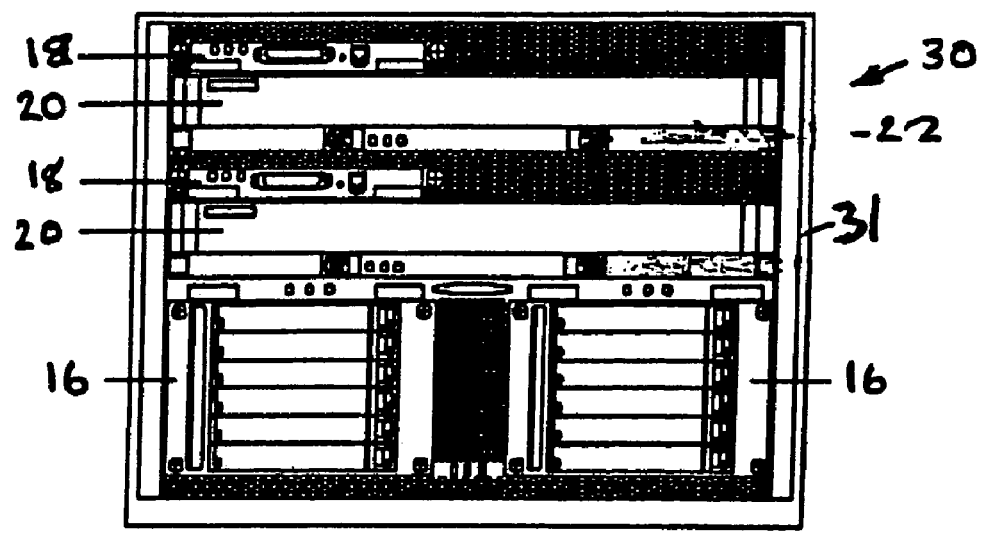
FIG. 2, formed from FIGS. 2A and 2B is a schematic illustration of a second computer system.
Figure 2B:
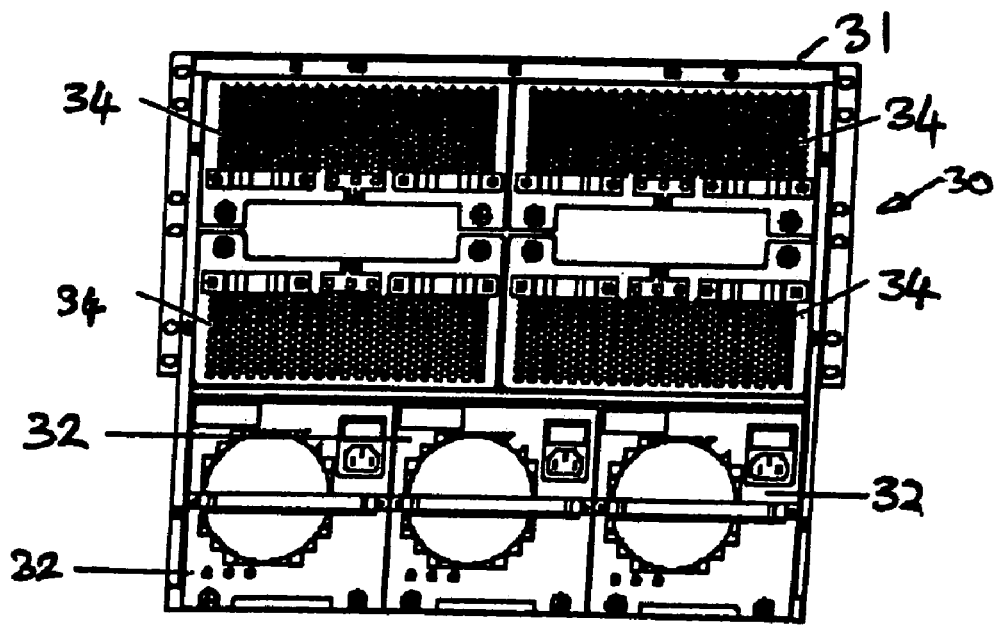

FIG. 1 is but one example of a system within which the present invention may be implemented. FIG. 2A is a front view of a second example of a computer server system 30 and FIG. 2B is a rear view of that system.

It will be noted that in this second example, two FRU modules in the form of system boards 20 and two further FRU modules in the form of system controller boards 18 are receivable in the front face of the chassis 31 of the computer server system 30. Two FRU modules in the form of I/O boards 16 are also receivable in the front surface of the chassis 31, each for receiving a number of I/O cards, for example PCI cards, which also form FRUs. As can be seen in FIG. 2B, three power supply FRU modules can be received in the rear face of the chassis 31 for providing N+1 DC power redundancy. Four fan tray FRU modules can also be received in the rear face of the chassis 31. It will be appreciated that FIG. 2 represents a lower end system compared to that shown in FIG. 1. For example, in the computer server system illustrated in FIG. 2, it is envisaged that between 2 and 8 processors could be provided mounted on the two system boards and that up to 128 Gbytes of memory could be provided. It will also be noted that switch interconnect boards are not shown in FIG. 2. In this example the switch interconnect circuitry is instead mounted on a midplane, or centerplane, within the system.

Figure 3A:
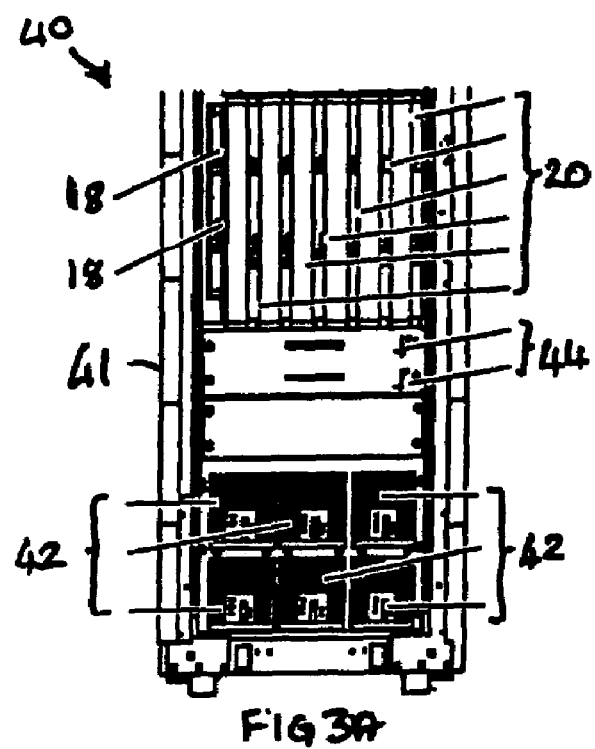
FIG. 3, formed from FIGS. 3A and 3B is a schematic illustration of a third computer system.
Figure 3B:
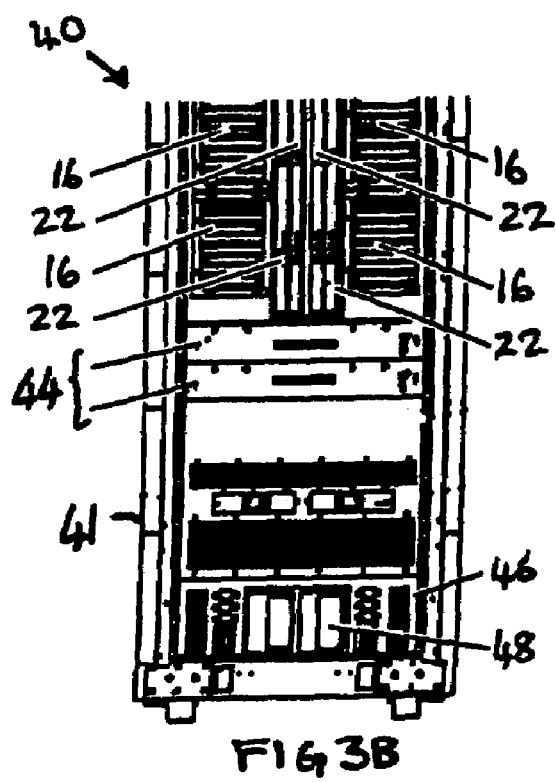

FIG. 3 illustrates yet another example of a computer server system 40 in which the present invention maybe implemented. FIG. 3A illustrates a front view of the computer system 40 mounted in a rack 41. FIG. 3B illustrates the rear view of that system.

As shown in 3A, up to six FRU modules in the form of system boards 20 are mountable in the front face of the rack 41. Up to two FRUs in the form of system controller boards 18 are also mountable in the front face. Up to six power supply FRU modules 42 and up to two fan tray FRU modules 44 are also mountable in the front face of the rack 41.

FIG. 3B illustrates up to four FRU modules in the form of I/O boards 16 received in the rear face of the rack 41. The I/O boards 16 are configurable to provide various I/O card slots, for example up to 32 PCI I/O slots. Up to four FRUs in the form of switch interconnect boards 22 are also mountable in the rear face of the rack 41. Two fan tray FRU modules 44 are also illustrated in FIG. 3B, as are a redundant transfer unit FRU module 46 and a redundant transfer switch FRU module 48.

For example, here support can be provided for between 2 and 24 processors mounted on the system boards 20 along with up to 384 Gbytes of memory. N+1 AC power redundancy can be provided. The system is also capable of receiving two separate power grids, with each power grid supporting N+1 DC power redundancy.

It will be appreciated that only examples of possible configurations for computer systems in which the present invention may be implemented are illustrated above. From the following description, it will be appreciated that the present invention is applicable to many different system configurations, and not merely to those illustrated above.

In the specific examples described, a high-speed system interconnect is provided between the processors and the I/O subsystems. The operation of the high-speed system interconnect will now be described with reference to FIG. 4.

Figure 4:
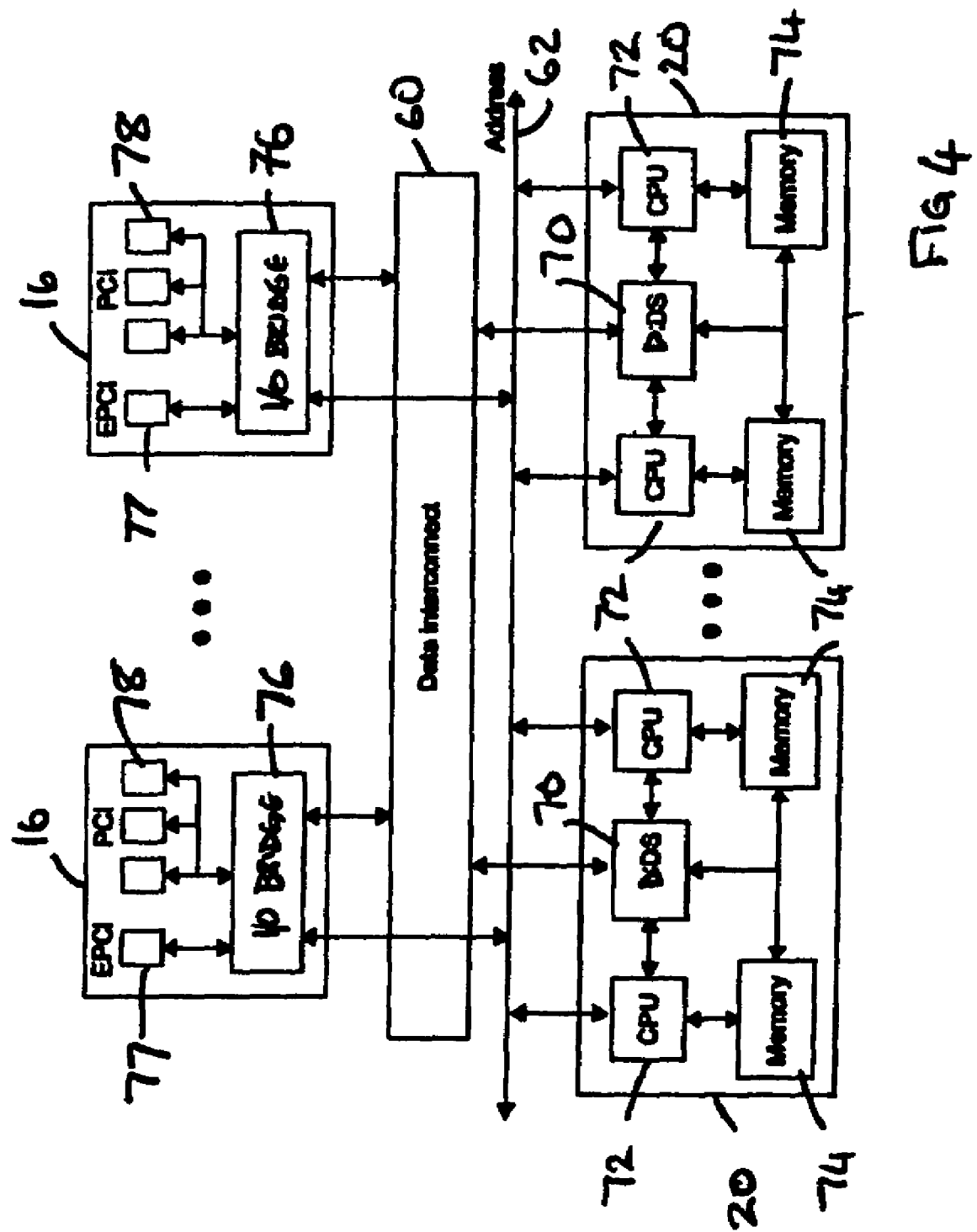
FIG. 4 is a schematic representation of an example of interconnections between system modules.

FIG. 4 illustrates the interconnection of the system boards 20 with the I/O boards 16 via a data interconnect 60 and an address interconnect 62. In the present example, a 288-bit data path with a high clock frequency (e.g. 150 MHz) can be provided between the processors (CPUS) 72 and I/O bridges 76 on the I/O boards 16. The I/O boards 16 can support, for example, conventional PCI cards 78, and also, for example, enhanced PCI cards 77. Selected components within the system boards 20 are also illustrated, including, for example, a dual data switch (DDS) 70, two processors (CPUs) 72, and two blocks of memory 74, each block of memory being associated with a respective processor 72.

The connection between the interconnect devices (the processors 72, and the I/O bridges 76) and the data path uses a point-two point model that enables an optimum clocking rate for chip-to-chip communication). The processors 72 are interfaced to the data path using the DDS 70.

A snoopy bus architecture is employed in the presently described examples. Data that has been recently used, or whose impending use is anticipated is retrieved and kept in cache memory (closer to the processor that needs it). In a multi-processor shared-memory system, the task of keeping all the difference caches within the system coherent requires assistance from the system interconnect. In the present example, the system interconnect implements cache coherency through snooping. With this approach, each cache monitors the addresses of all transactions on the system interconnect watching for transactions that update addresses it already possesses. Because all processors need to see all of the addresses on the system interconnect, the addresses and command lines are connected to all processors to eliminate the need for a central controller. Address snooping is possible between processors across the DDS 70, between the pairs of processors 72 on the same system board, and between system boards using interconnect switches.

The arbitration of address and control lines can be performed simultaneously by all devices. This can reduce latency found in centralized bus arbitration architectures.

Distributing control between all attached devices eliminates the need for a centralized system bus arbiter.

Figure 5:
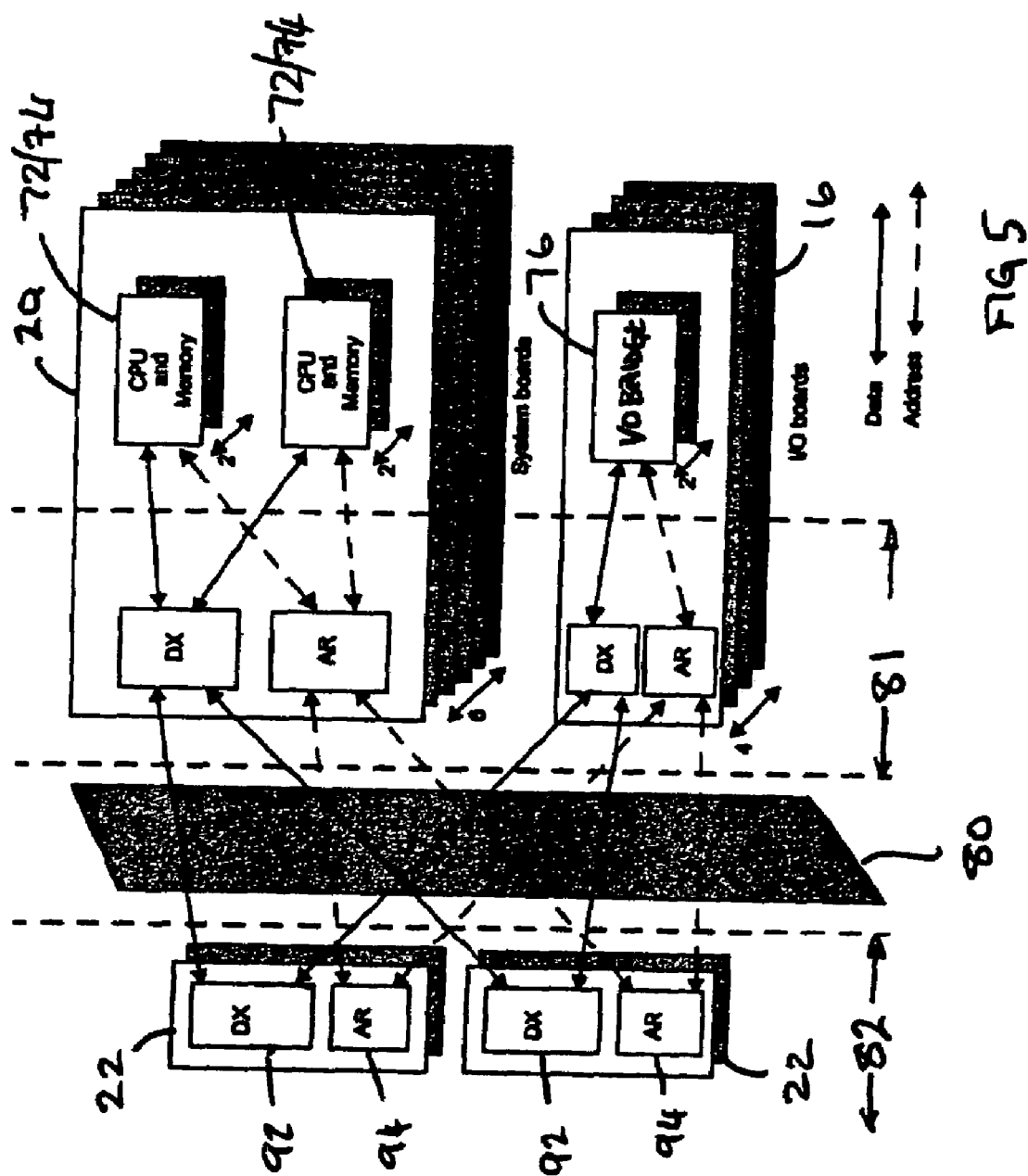
FIG. 5 is a schematic representation of an example of a two-level interconnect between system modules.

The operation of the system interconnect switches will now be described with reference to FIG. 5. The present architecture is designed with two levels of switches. One switch level 81 is incorporated into the system boards 20 and the I/O boards 16. The second level can be implemented as separate boards, for example as the switch interconnect boards 22 illustrated in the examples of computer server systems shown in FIGS. 1 and 3. Alternatively, the second level could be implemented, for example, on a motherboard or a centerplane. In an example of a computer system illustrated in FIG. 2, the second-level switches can be implemented on a centerplane (not shown in FIG. 2). The second level switches, whether implemented as independent interconnect switch boards 22, or on a centerplane or the like, include a data switch (DX) and an address repeater (AR). These can be implemented, for example, in one or more Application Specific Integrated Circuits (ASICs).

Transactions originating from the first-level switches 81 on the system boards 20 at the I/O boards 16 can be sent to the second-level switches 82. The second-level switches 82 can then direct the transactions to the correct board destination as is represented by the arrows in FIG. 5.

Figure 6:
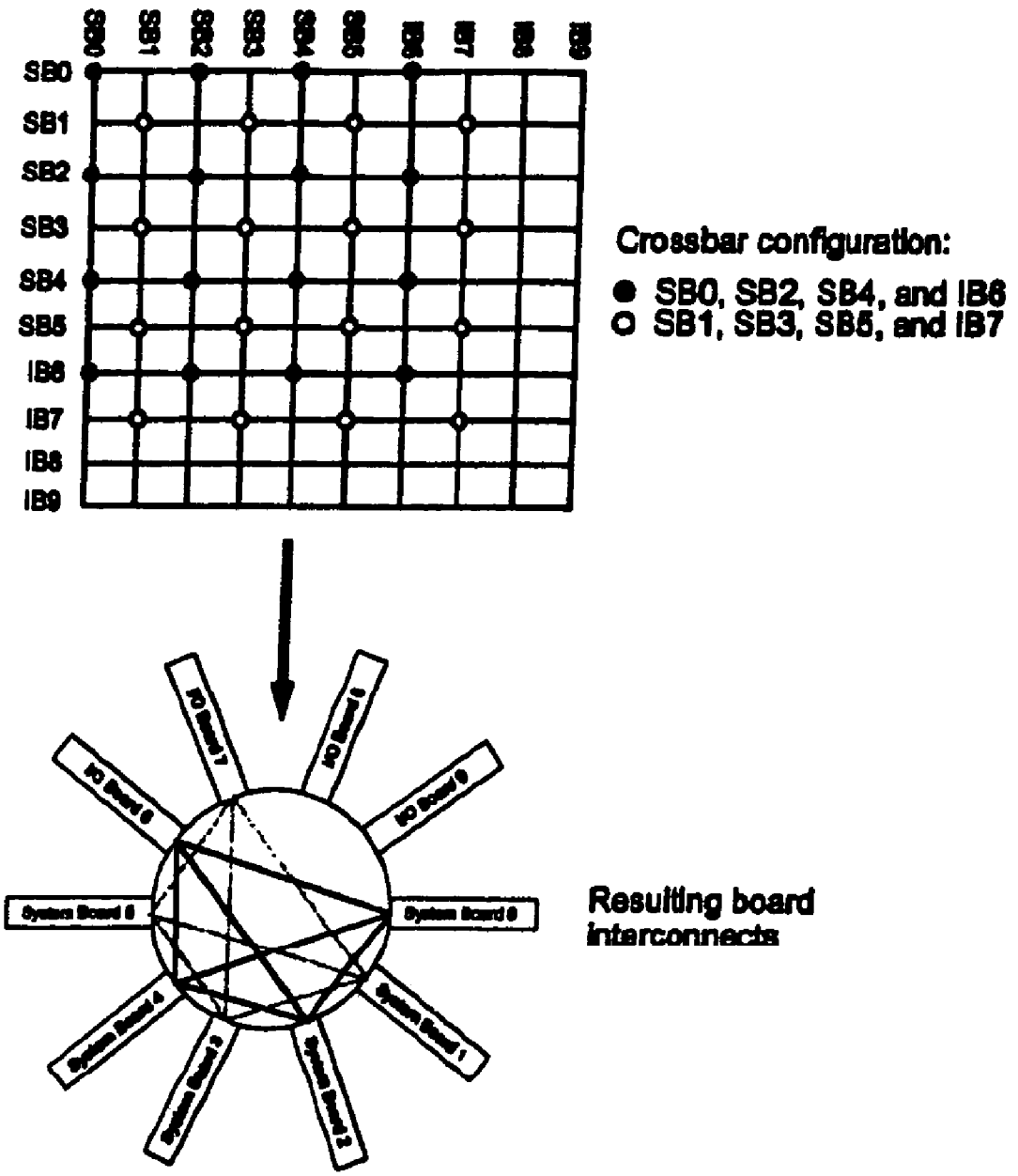
FIG. 6 illustrates examples of crossbar connections.

The system boards 20 and the I/O boards 16 only see messages to and from the boards in their own processor domain. FIG. 6 illustrates possible crossbar connections whereby the "crosses" in the crossbar are only enabled if their respective boards are in the same domain. The enables the domains to configure their busses independently. All components have access to all busses.

Figure 7:
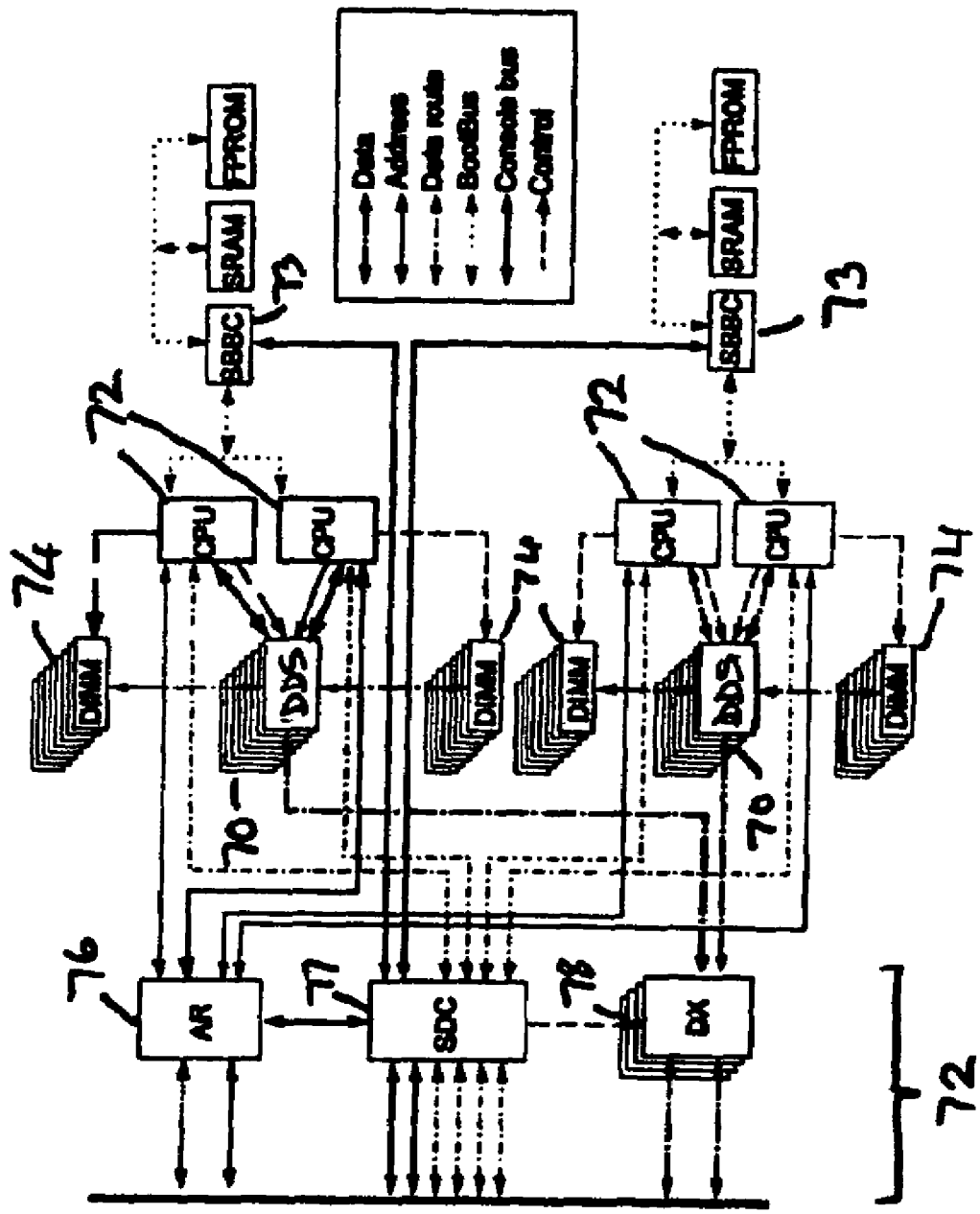
FIG. 7 is a schematic representation of an example of a system module.

FIG. 7 illustrates an overview of a system board 20. Each system board 20 can support up to four processors (for example for Ultra SPARC (TM) processors). Each processor can support two banks of memory, and each memory bank can include, for example, four Dual In-line Memory Modules (DIMMS) 74. The server architecture can support mixed processors, whereby the processors on different boards may have different clock speeds. The processors can include external cache (E cache). The processors 72 and the associated memory 74 are configured in pairs on the system boards 20 and are interconnected with a dual data switch (DDS) 70. The DDS 70 provides a data path between the processors of a pair and between processor pairs and the switch interconnect.

As mentioned above, the system board also contains first-level switch interconnect logic in the form of an address repeater (AR) 76 and a data switch (DX) 78, which can provide a means for cache coherency between the two processor pairs and between the system board and the other boards in the server using the switch interconnect. The address repeater 76 and the data switch 78 can be implemented by one or more ASICs. Each system board also contains a system data controller (SDC) 77, which can also be implemented as an ASIC. The SDC 77 multiplexes console bus connections to allow all system boards 20 and switch interconnect boards 22 to communicate to each of the system controller boards 18. A system boot bus controller (SBBC) 73 is used by the system controllers on the system controller boards 18 to configure the system board 20. It will be noticed that a static random access memory (SRAM) and a field programmable read only memory (FPROM) are connected to the SBBC 73.

Figure 8:
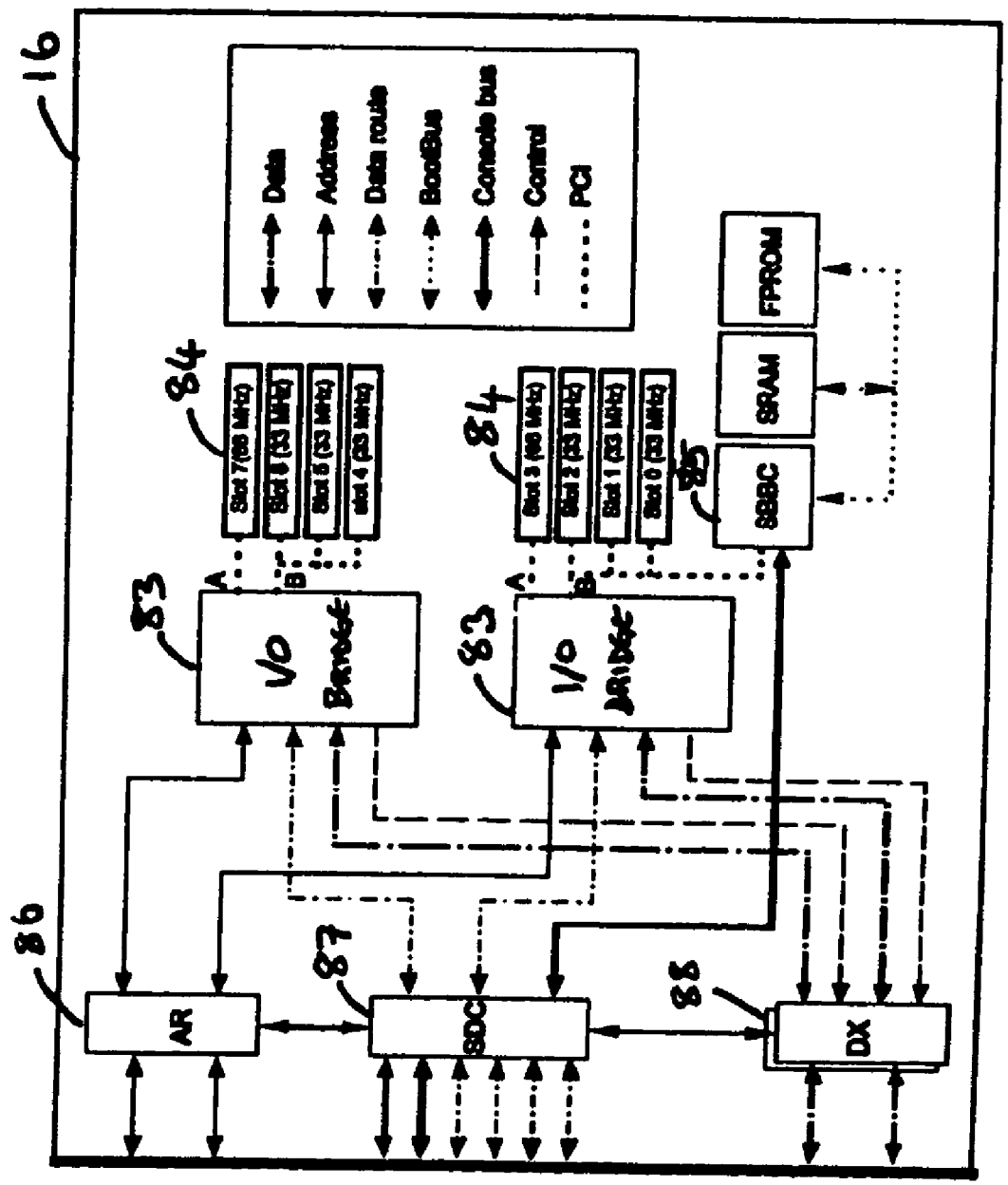
FIG. 8 is a schematic representation of an example of an I/O module.

FIG. 8 illustrates the major data structures in an I/O board 16. The I/O boards can be attached to a centerplane in the server computer system. Each I/O board 16 is self-contained and hosts a number of I/O cards.

The I/O board can include by two I/O bridges 83. On the server side, each I/O bridge 83 interfaces to the system interconnect. On the I/O side, each I/O bridge 83 provides respective I/O busses, for example in the present case two PCI buses. A first (A) bus has an enhanced PCI (EPCI) logic supporting one enhanced PCI card. The second (B) bus can have standard PCI logic supporting multiple standard PCI cards.

Each I/O board 16 can contain a system data controller (SDC), which can be implemented as an ASIC, and is used to multiplex console bus connections to allow all system boards to communicate to the system controllers on the system controller boards 18. A SBBC 85 can be used to configure the I/O board 16.

The I/O board also contains first level switch interconnect logic in the form of an address repeater 86 and a data switch 88, which can also be implemented as one or more ASICs. -The first level switch interconnect switching logic provides an interface to the switch interconnect described above.

The architecture of the examples of computer systems shown in FIGS. 1-3 is designed to support two integrated service processors (or system controllers). These system controllers are implemented using the system controller boards 18. The integrated system controllers can perform functions including:

providing a programmable system and processor clock;
    setting up the server and coordinating a boot process;
    monitoring environmental sensors;
    indicating the status and control of power supply;
    analyzing errors and taking corrective action;
    providing server console functionality;
    providing redundant system controller board clocks;
    setting up server segments (partitions) and domains;
    providing a centralized time-of-day; and
    providing centralized reset logic.

Figure 9:
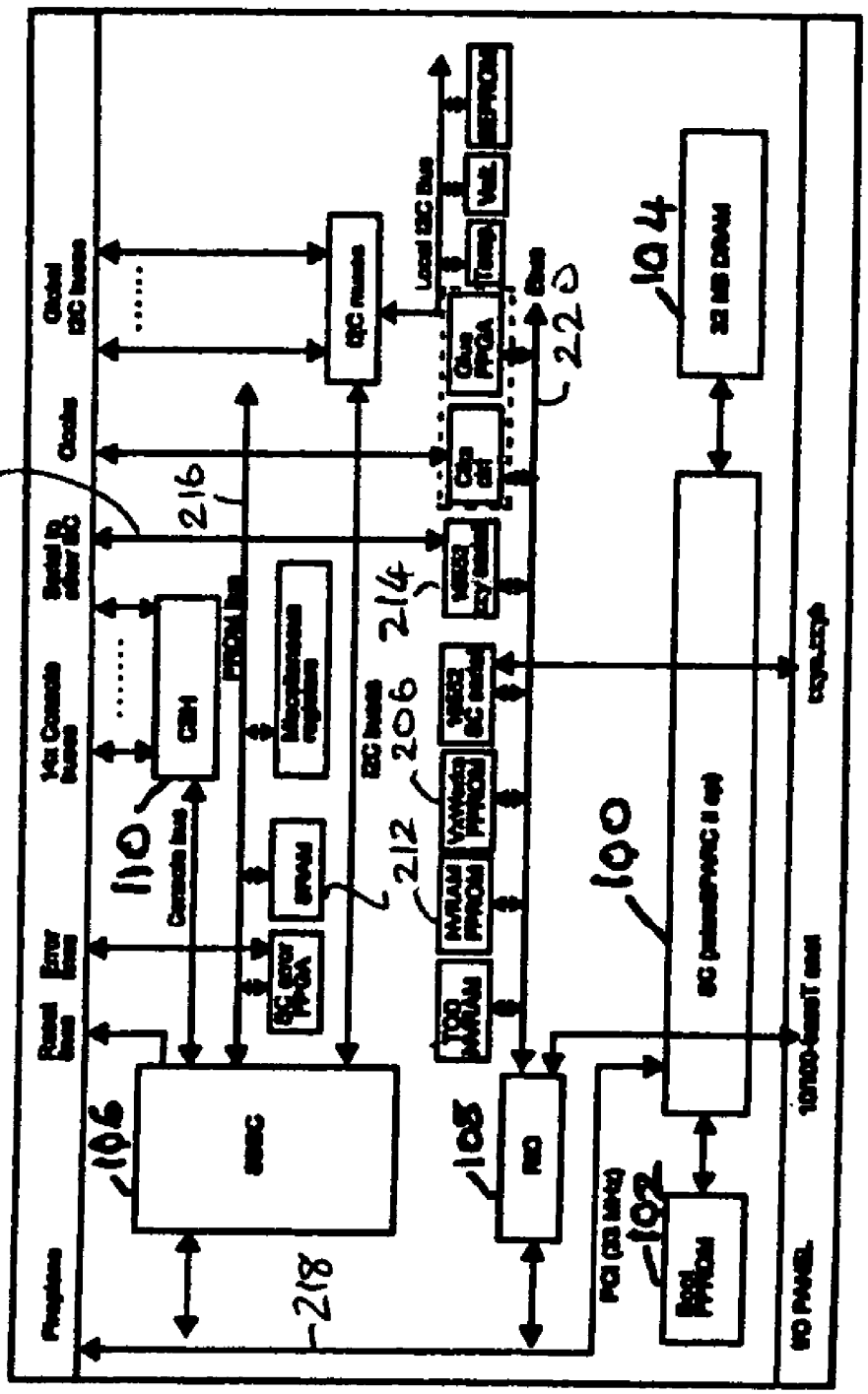
FIG. 9 is a schematic representation of an example of a system controller module.

FIG. 9 illustrates an example of a system controller board 18. Each system controller board 18 contains a console bus hub (CBH) 110. The CBH interconnects the system controller to the console bus, which, in turn, is connected to the system boards 20, the I/O boards 16 and the switch interconnect boards 22.

The console bus is a broadcast medium for commands and data packets. This allows the system controller to configure and test the various components in the server by reading and writing registers on each of the system boards 20.

As mentioned above, each of the system board 20, the I/O board 16 and the switch interconnect board 22 contains a SDC, which multiplexes console bus connections to allow each of these boards to communicate with the currently active system controller.

One of the system controller boards 18 acts as a main system controller board and provides a server clock and server control/monitoring logic.

A global maintenance bus structure is used to monitor the environmental integrity of the server. The monitoring structure is under the control of the system controller and uses the I2C bus structure. The I2C bus can be operable to monitor server voltages, temperatures, fan speeds, etc. The I2C bus also functions as the read/write bus for field replaceable units (FRU) identities (FRUIDs). Each of the FRUs include storage, for example an electrically erasable programmable read only memory (EEPROM), for receiving the FRUID and other data.

As mentioned above, one of the system controller boards 18 operates as a main system controller board. The other system controller board 18 operates as a redundant system controller board, and is used to provide a back-up system clock and back-up services if the main system controller board fails.

Any suitable algorithm can be used to determine which of the system controller boards is to act as the main. For example, the system could default to the system controller board in slot zero acting as the main.

It should be noted the various elements identified in FIG. 9 will be described later in more detail with reference to FIG. 15.

Figure 10:
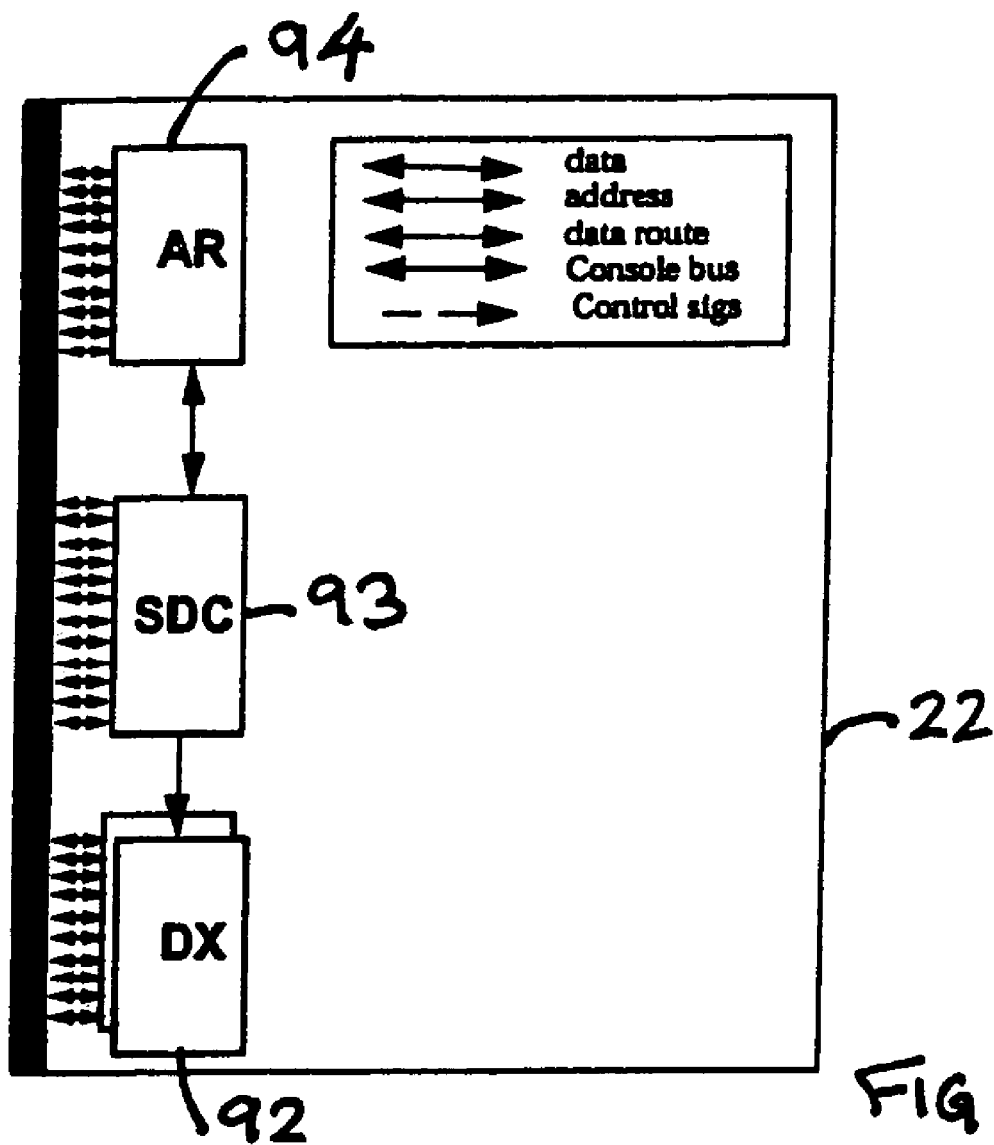
FIG. 10 is a schematic representation of an example of a switch interconnect module.
Figure 11:
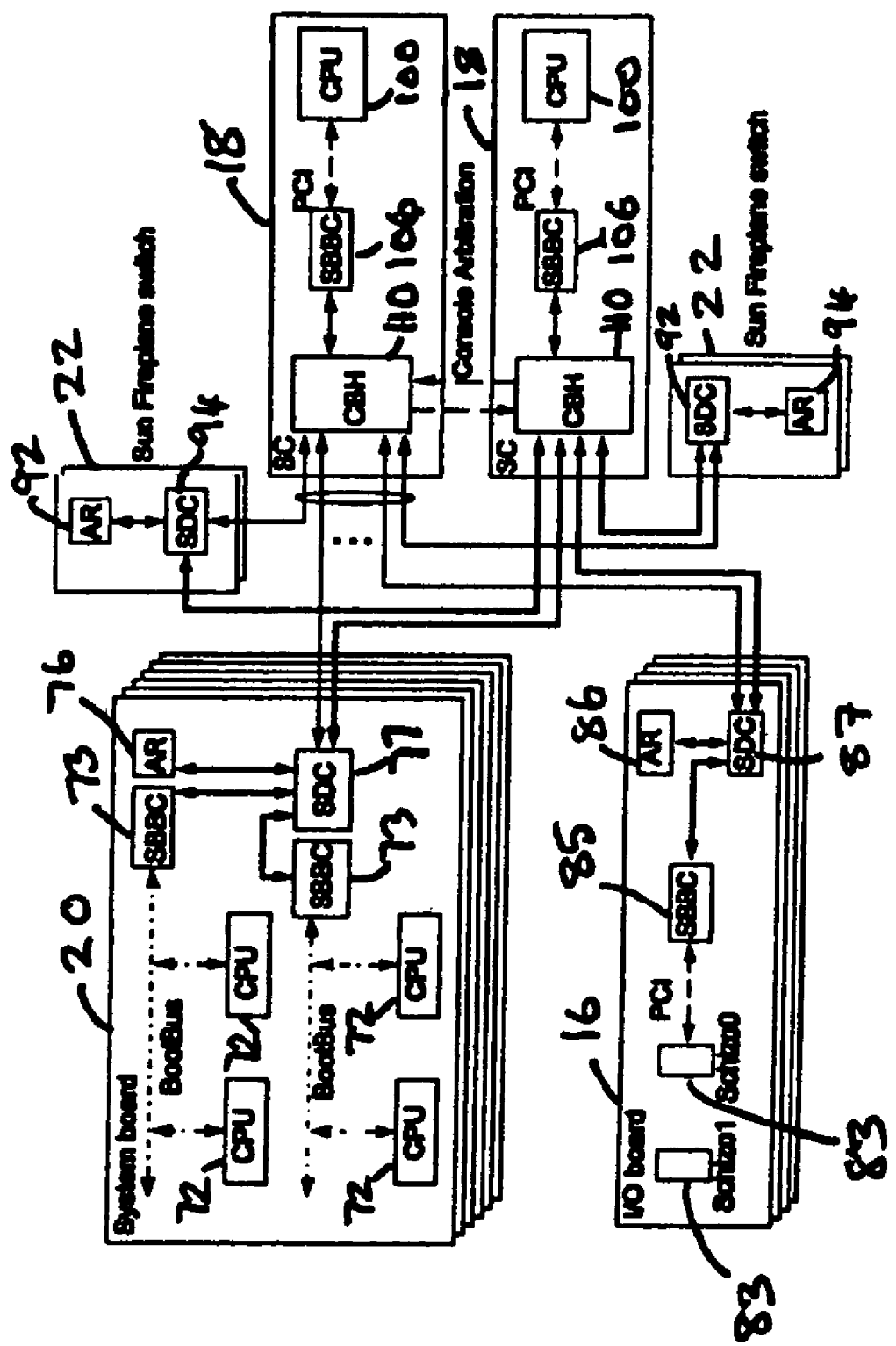
FIG. 11 is a schematic representation of an example of interconnections between the modules of FIGS. 7 to 10.

FIG. 10 illustrates a switch interconnect board 22. As well as the DX 92 and AR circuits AR 94 represented in FIG. 5, it will be noted that an SDC 93 is included that provides functionality similar to that of the SDC 77 of the system board 20 illustrated in FIG. 7 and the SDC 87 of the I/O board 16 illustrated in FIG. 8. FIG. 11 illustrates the connections between the system controllers, the console bus, and the SDC 77 in the system board 20, the SDC 87 in the I/O board 16 and the SDC 94 in the switch interconnect board 22.

When power is turned on to the server system, the system controller operating system boots and then starts a system controller application remembers a domain configuration from when the server was last powered off, and builds the same configuration again. It then turns on system boards, tests them, and attaches the boards together into domains. It then brings up the operating system environment in each domain and starts the configured domains. It manages the hardware side of the domain configuration, and then continuously monitors the server environment.

The various FRU modules described above, are interconnected by one or more centerplanes. The number of separate centerplanes can be varied according to a particular model. In some systems, the centerplane can be a passive component, with no active components thereon. Alternatively, the system centerplane can be an active centerplane containing at least some circuitry. Thus, for example, in the example of the system shown in FIG. 2, switch interconnect board circuitry and logic is provided on the centerplane.

The centerplane can also carry an ID board (not shown). This can be pre-programmed daughter board on the server centerplane, and can contain an EEPROM. The EEPROM can include information such as a server chassis ID, a server serial number/host ID, media access controller (MAC) addresses for the server and, also, server and component power-on hours. This ID board can be considered as a single FRU.

As mentioned earlier, the server systems can be provided with redundant power supplies, with appropriate power connections being provided from the PSUs over the centerplane(s) to the mounted FRUs.

The systems described with reference to FIGS. 1-3 include fan trays or blower assemblies that provide redundant cooling if one fan tray or blower assembly fails. The number of fan trays and the configuration of the fan trays can be adapted to suit the physical configuration and power requirements of the individual server systems.

Other FRUs can be provided, as appropriate, in the systems described above. Thus, for example, media trays for receiving removable or fixed media devices can also be provided. Also sub-assemblies and separate components can (e.g. DIMMs) can be configured as FRUs.

Each FRU is provided with a FRUID EEPROM as described above. The EEPROM is split into two sections, of which one is read-only (static) and the other is read-write (dynamic). The static section of the EEPROM contains the static data for the FRU, such as the part number, the serial number and manufacturing date. The dynamic section of the EEPROM is updated by the I2C bus with power-on hours (POH), hot-plug information, plug locations, and the server serial number. This section of the EEPROM also contains failure information if the FRU has an actual or suspected hardware fault, as will be described later. This information is used the service controller to analyze errors and by repair centers to further analyze and repair faults.

Also the circuitry in the FRUs is provided with error registers for recording errors. The registers can be configured to record first errors within a FRU separately from non-first errors At least some of the FRU circuitry can be implemented as Application Specific Integrated Circuits (ASICs), with the registers being configured in the ASIC circuitry in a conventional manner. The FRUs can also be provided with further circuitry (e.g., in the form of a Field Programmable Gate Array (FPGA)) that is responsive to the error signals being logged in the ASIC registers to report the presence of such error signals to the system controllers.

The FRU circuitry follows a standard error reporting policy. Where the circuitry comprises one or more ASICs, each ASIC can have multiple error registers. There can be one error register per data port and one error register per console port, as well as other error registers. Each error register's bit 15 is First Error (FE) bit. The FE bit is set in the first error register in the ASIC that has an unmasked error logged and all subsequent errors will not set the FE bit in any other register in the ASIC until the FE bit is cleared in all registers in that ASIC. However, if multiple registers log an error simultaneously, then the FE bit could be set in multiple registers. The existence of an FE bit that is set prevents the other FE bits in the chip from being set. If the FE bit that is set in a device is cleared before the individual error bits are cleared in other error registers in the chip, the FE bit will be set again in the other registers. Each error register can be divided into two sections of 15 error bits each: [30:16] and [14:0]. Masked errors for that registers and the first unmasked error (or multiple first unmasked errors if they occur in the same cycle) for that register can be reported in the [14:0] range. Subsequent errors (masked or unmasked) will be accumulated in the [30:16] range. In the present example, the convention for the error bits is RW1C (read, write one to clear). Thus, appropriate error bits are recorded, in a conventional manner, in registers in the ASICs when errors occur.

The examples of the server systems described with reference to FIGS. 1-3 can be organized into multiple-administrative/service layers. Each layer can provide a set of tools or configure, monitor, service and administer various aspects of the server system.

Figure 12:
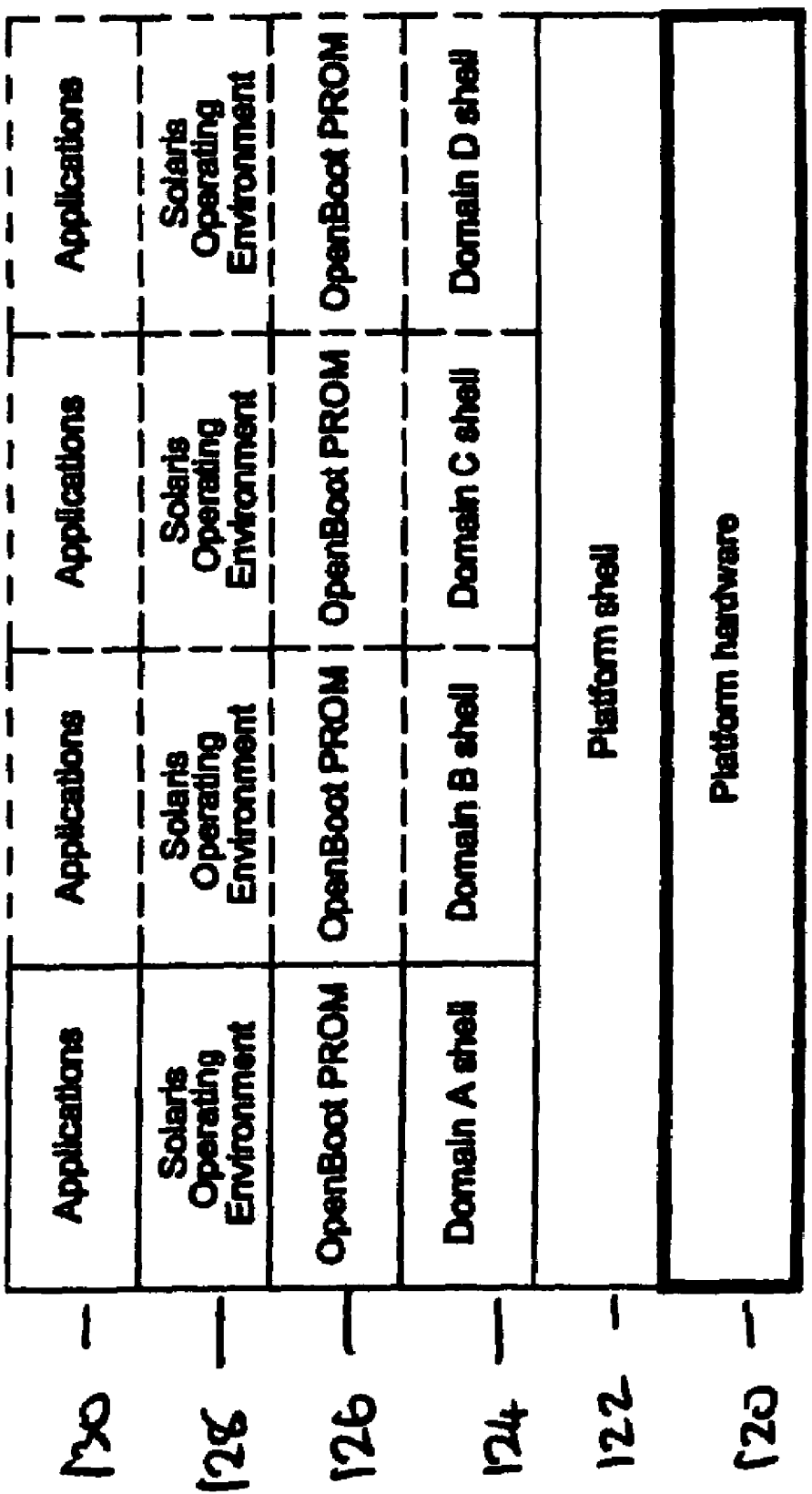
FIG. 12 is a schematic representation of a system architecture.

FIG. 12 illustrates an example of such a layered structure. Thus, as shown in FIG. 12, above a platform hardware level, a platform shell level 122 is defined. Above the platform shell level 122, a further shell level is defined for each processor domain within the system. Above each domain shell level 124, an Open Boot PROM layer 126 is defined. Above the Open Boot PROM level 126 is defined. Above the Open Boot PROM level, an operating environment 128 layer (e.g. for a Solaris operating system) is defined. Above the operating environment layer 128, applications 130 are then defined. It will be appreciated that the foregoing description was directed generally to the platform hardware level 120.

Once the system server hardware has been configured as described above, platform configuration parameters can be set for level 120 using software provided on the system controller. The system controller software provides system administrators and service personnel with two types of shells with which to perform administrative and servicing tasks. These shells form the platform shell 122 and the domain shells 124.

Using the platform shell 122, it is possible to: configure the system controller network parameters; configure platform-wide parameters; configure partitions and domains; monitor platform environmentals; display hardware configuration information; power on and power off the system and system components; set up hardware level security; set a time of day clock; test system components; blacklist system components; configure the platform for Capacity-On-Demand (COD) software; and update the system firmware.

The platform shell 122 can be configured using the console capability provided through the system controller board. Access can be achieved through a serial port console connection, or an Ethernet port shell connection. It is possible to configure network parameters for the system controller and also to define Power On Self Test (POST) parameters.

With regard to the domain shell layer 124, it is to be noted that the examples of the server computers illustrated in FIGS. 1-3 can be split into multiple segments (also known as partitions) and multiple domains. Both provide means of dividing a single physical system into multiple logically independent systems, each running its own operating system environment (e.g. a Solaris operating system environment). The system controller provides a shell interface for each defined domain to perform administrative and servicing tasks. It is this shell interface which forms the respective "domain shells" represented at 124 in FIG. 12.

With a domain shell, the following functions can be performed: add physical resources to a domain; remove physical resources from a domain, set up domain level security; power on and power off domain components; initialize a domain; test a domain; and configure domain-specific configuration parameters.

The term segment refers to all, or part, of the system interconnect. Placing the platform in dual-partition (segment) mode results in splitting the system interconnect into two independent "snoopy" coherent systems.

When a platform is split into two segments, the interconnect switchboards are divided between the two segments, causing the platform to behave as if each system were physically separate.

Segments can be logically divided into multiple sections called domains. Each domain runs its own operating system environment and handles its own workload. Domains do not depend on each other and are isolated on the system interconnect.

Adding new domains can be useful for testing new applications or operating system updates, while production work continues on the remaining domains. There is no adverse interaction between any of the domains, and users can gain confidence in the correctness of their applications without disturbing production work. When the testing work is complete, the domains can be rejoined logically without a system reboot. Each domain will contain at least one system board 20 and at least one I/O board 16 with enough physical resources to load the operating system environments, and to connect to the network. When the domains are initialized, the system boards 20 and the I/O boards 16 are connected to the interconnect switchboards to establish a "snoopy" coherent system.

Figure 13:
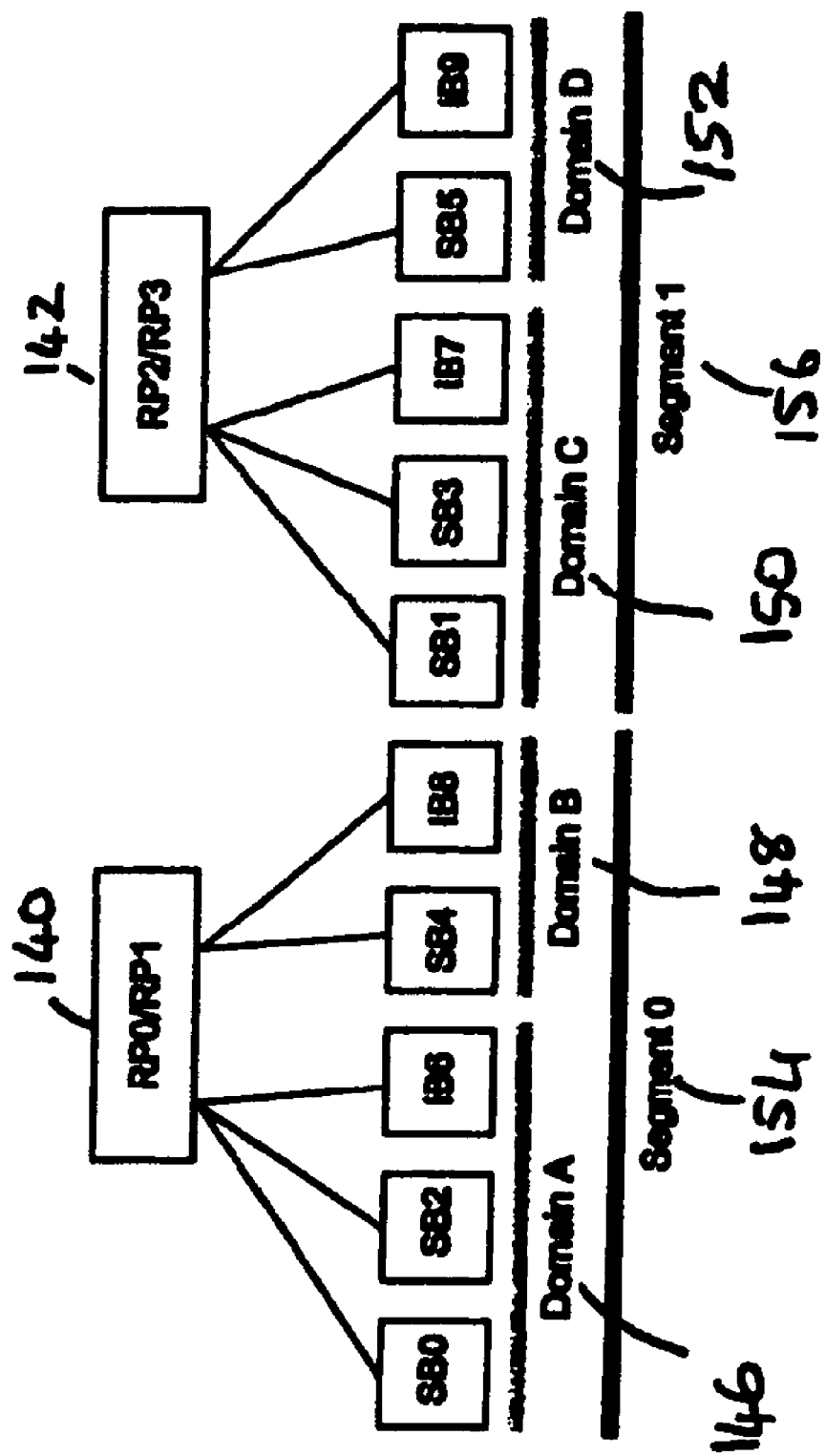
FIG. 13 illustrates a configuration providing multiple processor domains.

FIG. 13 illustrates an example of a server system configured with four domains, 146, 148, 150 and 152. Domains 146 and 148 form part of a first segment 154 with respect to switch interconnect, or repeater boards RP0/RP1 140. Domains 150 and 152 are configured in a second segment 156 with respect to switch interconnect, or repeater boards RP2/RP3 142. The total number of domains can depend on a particular model or server and the number of segments configured on that server.

The OpenBootPROM (OBP), identified as level 126 in FIG. 12, is a firmware layer that is responsible for identifying available system resources (disks, networks, etc) at start-up time. When the operating system environment boots, it uses this device information to identify the devices that can be used by software.

After the system, or domain, completes its power-on self-test (POST), available healthy devices are attached to a host computer through a hierarchy of interconnected buses. Open Boot represents the interconnection buses and their attached devices as a tree of nodes. This tree is called a device tree. A node representing the host computer's main physical address bus forms the tree's root node.

Each device node can have properties (data structures describing the node and its associated device), methods (software procedures used to access the device), data (initial values of the private data used by the methods), children (other devices "attached" to a given node and lying directly below it in the device tree) and a parent (the node that lies directly above a given node in the device tree).

Nodes with children usually represent buses and their associated controller, if any. Each note defines a physical address space that distinguishes the devices connected to the node connected to the node from one another. Each child of that node is assigned a physical address in the parent's address space.

Nodes without children are called leaf nodes and generally represent devices. However, some nodes represent system-supplied firmware services. Open Boot deals directly with hardware devices in the system. Each device has a unique name representing the type of device and where that device is located in the system addressing the structure.

Figure 14:
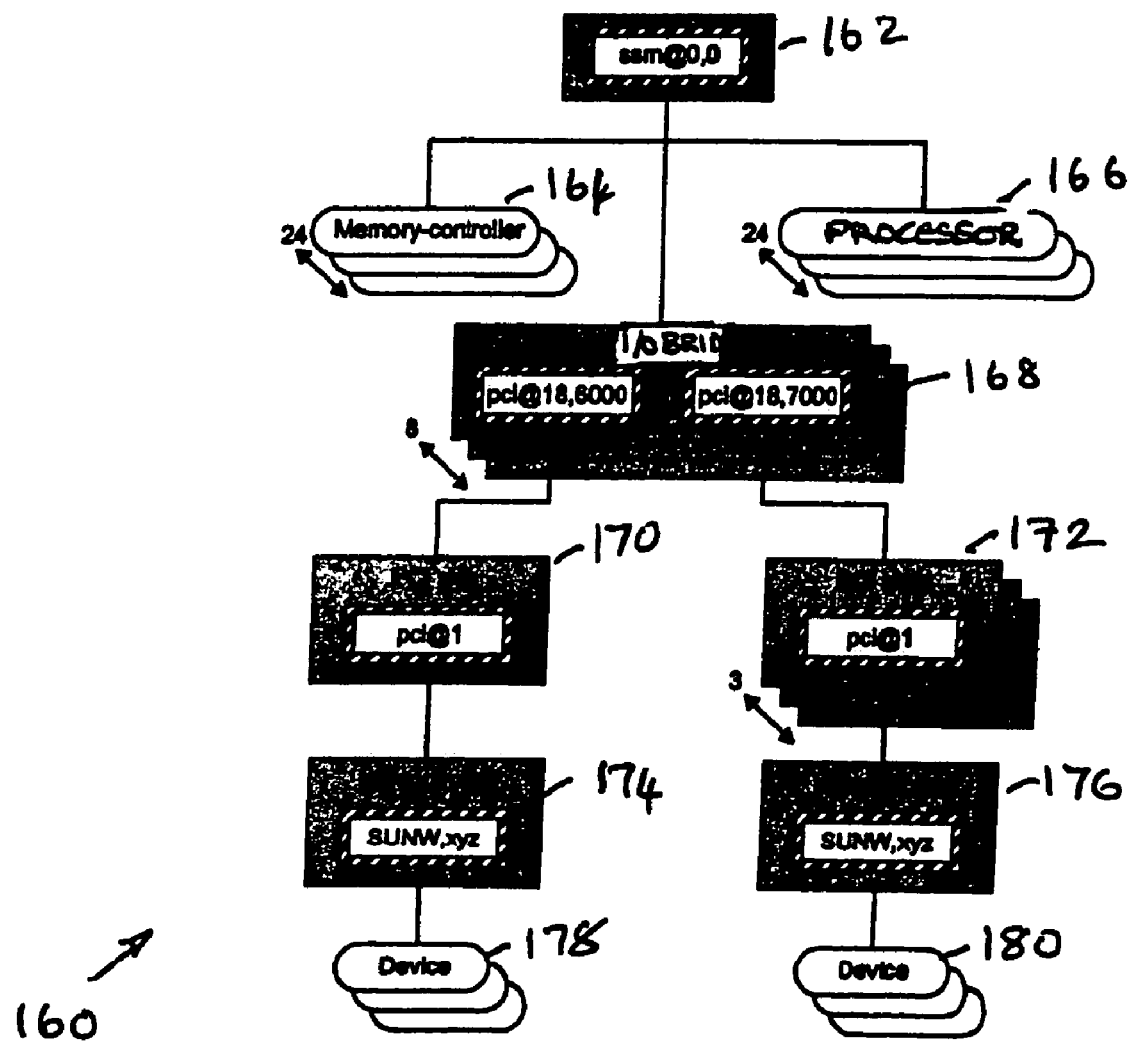
FIG. 14 is a schematic representation of a system configuration hierarchy.

FIG. 14 illustrates some of the components of a simplified representation of such a device tree. As mentioned above, a root node 162 represents the host computer's main physical address bus. Child leaf nodes 164 and 166 represent memory-controllers and processors, respectively. A child node 168 represents the I/O bridges 76 shown in FIG. 4. Further nodes 170 and 172, which are children of the node 168, define PCI slots within the I/O bridge. Child nodes 174 and 176 of the nodes 170 and 172, respectively, represent respective I/O controllers. Leaf nodes 178 and 180, which form child nodes of the nodes 174, represent respective devices.

With regard to physical device mapping, a physical address generally represents a physical characteristic unique to a device (such as a bus address or slot number where the device is installed). The use of a physical address to identify a device prevents device addresses from changing when other devices are installed or removed. Each physical device is referred to by its node identifier and an agent identifier (AID). When providing system board mapping, account is taken of the number of possible components within a given system organization. Thus, with regard to the example shown in FIG. 1-3, it will be noted that there can be up to six system boards, depending on the model, with each system board having up to four processors. Each system board also contains up to eight banks of memory, with two banks per processor. Each pair bank is controlled by one memory management unit, which is co-packaged with its respective processor. Accordingly, the AID for an MMU can be the same as the processor AID, but with a different offset.

Similarly, for configuring other components such as mappings for I/O, the numbers of the various components is taken into account when determining that mapping.

The operating system environment (in the present examples a Solaris (TM) operating environment) 128 can support a wide variety of native tools to help monitor system hardware configuration and health. In, for example, a Solaris 8 operating environment, system components can be referenced using logical device names (names used by systems and administrators and software to access system resources), physical device names (names that represent the full device path name and the device information hierarchy (or tree) and instance names (the kernel's abbreviated names for each possible device on the system). Logical device names are symbolically linked to their corresponding physical device names. The logical names are located in a directory and are created at the same time as the physical names. The physical names are located in a different directory where entries are created during installation or subsequent automatic device configuration or by using a configuration command. The device file provides a pointer to the corresponding kernel device drivers. In the Solaris 8 operating environment, the instant name is bound to the physical name by specific references. A specific utility can be used to maintain the directories for the logical and physical names.

The primary responsibility for the collection, interpretation, and subsequent system responsive actions regarding error messages lies with the system controller(s). Each system controller receives error messages from each of the boards in a domain, that is, the system boards 20, the I/O boards 16 and the switch interconnect boards 22. Each of these boards drives two copies of any board error messages per domain, one to each system controller board. The system boot bus controller (SBBC) 106, located on the system controller board 18 (see FIG. 9), determines the action to take on the errors.

Typical actions can include: setting appropriate error status bits; asserting error pause to stop further address packets; and interrupting the system controller At this point, the system controller software takes over, reading the various error status registers to find out what happened. After detecting the cause of the error, the system controller might decide whether the error is recoverable.

If the error is recoverable, the system controller could potentially clear the error status in the appropriate registers in the boards that detected the error. If the error is not recoverable, the system controller might decide to reset the system. Error signals, error pause signals, and reset signals can be isolated per partition and domain so that errors in one partition or domain do not affect other partitions or domains.

The system controller does not have permanent storage of errors, warnings, messages, and modifications. Instead, these items are stored in a circular buffer, which can be viewed using a specific command in either the platform or domain shells.

Additionally, there can be a host connection to the system controller using Ethernet, as well as a host option when using a remote management center The identification of a probably failed FRU can be based on the class of the error. Errors generally fall into two classes, that is domain errors and environmental errors. Domain errors can typically apply to physical resources that can be assigned to a partition, domain, or both, such as the system boards 20, the I/O boards 16, and the switch interconnect boards 22. Domain errors can also apply to the bus structures. Environmental errors can typically apply to physical resources that are shared between domains, such as power supplies and fan trays. Environmental errors can also include overtemperature conditions.

Tables can be maintained by the system controller to relate the types of errors to the FRUs that are probably responsible for those errors.

An example of information that might be included in such a table is set out in Table 1 below:

TABLE 1

| ERROR CLASS | PROBABLY FAULTY FRU |
|---|---|
| Domain Console bus | |
| Parity | The target board, the system controller, or the centerplane. |
| Time-out | The target board, the system controller, or the centerplane. If the clocks or the voltage AC levels on the target board are bad, then most likely it is the target board. |
| Protocol | The target board, the system controller, or the centerplane. |
| Interconnect | |
| Internal | Replace the FRU indicated by the error |
| Interconnect | The board containing the L1 interconnect switch/board indicated by the error, the L1 interconnect switch/board at the other end of the link, or the centerplane. Verify whether or not the errors move with the L1 interconnect switch/board when moved to another slot. For the Data switch (DX) incoming parity errors, if parity was corrupted inside L1DX before the packet was transmitted to the interconnect switch board, then the L1DX logs an internal parity error while the interconnect switch board logs an incoming parity error. In this case, the failed FRU is L1 the transmitting board. |
| AR ASIC | |
| Switchboard check errors | The board containing the L1 interconnect switch, both interconnect switch boards, or the centerplane. |
| Interconnect port queue overflow or underflow | For interconnect switch board overflows or underflows: one of the interconnect switch boards, the board containing the L1 interconnect switch logic attached to the port, or the centerplane. For L1 interconnect switch overflows: the board containing the L1 interconnect switch logic, the processor, or a processor connection. |
| AR transaction count underflow or overflow | An internal ASIC or L1 and L2 link failure. If an L1 and L2 failed link is the cause, then there should also be L2 check errors. The failed FRU might be the board itself, one of the other L1 domain boards, or the centerplane. |
| System data controller ASIC | |
| DtransID arbitration | The CPU, the CPU socket, or the centerplane. |
| TtransID and TargID arbitration | The system board for a local interconnect port, the interconnect switch board, or the centerplane for an inbound interconnect port. |
| DtransID ID | The system board. |
| TtransID and TargID ID | The system board for a local interconnect port, the system board, the interconnect switch board, or the centerplane for incoming interconnect port. |
| DtransID Queue overflow | The system board. |
| TtransID and TargID Overflow | A spare error tied to TtransID and TargID arbitration. |
| TtransID and TargID L2 Parity | The system board for a local interconnect port, the system board, the interconnect switch board, or the centerplane for incoming interconnect port. |
| Parity single | The system board. |
| Parity bidirectional | The system board for a local interconnect port; the system board, the interconnect switch board, or the centerplane for incoming interconnect port. |
| DX ASIC | |
| Interconnect or I/O Bridge FIFO overflow or underflow | Possibly the system data controller on same board; if flow-control problems are evident, then problem could be off-board. |
| SBBC ASIC | The system board (a failed CPU or CPU socket). |
| BootBus not idle | The system board (a failed CPU or CPU socket). |
| CBH ASIC | Refer to console bus errors with one exception: a console bus arbitration error can be caused by software if the second system controller sets its arbitration bit and forces control of the bus to itself. |
| DDS ASIC | The system board primary |
| System clock | The system controller (0 or 1) or the centerplane. |
| Ecache | The system board. |
| L1 Interconnect switch ECC | The failed FRU might not be identified depending on the ECC error detected and whether it can be associated with any other ECC errors. L1 checkers provide the following:<br>DtransID-ID of target interconnectdevice<br>Syndrome-9 bit interconnect syndrome<br>Outbound or inbound<br>Read, write-read, or write transaction |

TABLE 1-continued

| ERROR CLASS | PROBABLY FAULTY FRU |
|---|---|
| | Correlate preceding data against other ECC errors detected by L1 ECC checkers to attempt to determine the source of the error. There are many scenarios involving different sources and destinations for memory and where the memory gets corrupted. |
| Interconnect - interconnect device on same DX port (same board) | The system board. |
| Interconnect - interconnect device on other DX port (same board) | The system board. |
| Interconnect - interconnect device on different boards | If DX port detects outbound ECC error whose Dtrans is targeted to another board and an ECC error is detected on the target board, then the faulty FRU is sourcing board. If a DX port detects an inbound ECC error but no board sources the error, examine the data path for possible parity errors. If parity errors have occurred, then the devices involved in the interconnect link are suspect. If no parity errors occur in the data path, then the interconnect switch board is the failed FRU. |
| Environmental | |
| Over - temperature | These errors can be attributed to several sources: failed fans, an overheated room, or disrupted air flow. The software should detect failed or missing fans and indicate to replace those FRUs, however the system controller cannot determine the room temperature and also whether filler panels are replaced when boards are removed. |
| DC-DC converter | The system or interconnect switch board on which the converter resides. |
| Power supply | With the exception of AC line input failure, the power supply itself. |
| Fan failure | An associated fan tray. |

It will, however, be appreciated that more and/or different information can be used in such tables, dependent upon specific requirements, Table 1 being merely given as an example of the type of information to be held in the tables. In any particular implementation, the specific information stored can be derived from the configuration in interrelationships of the components of the system.

As mentioned above, one of the system controller boards 18 operates as a main system controller board. The other system controller board 18 operates as a redundant, or spare, system controller board, and is used to provide a back-up system clock and back-up services if the main system controller board fails. In order that the spare system controller board can take over in the event of the failure of the main system controller board, it is necessary that system information maintained by the main and spare system controllers are synchronized, that is that they contain the same data.

The spare system controller can monitor the health of the main system controller by, for example, monitoring a heartbeat generated by the main system controller. If the heartbeat stops or falters, then this can be taken as, for example, one potential indicator of the main service controller failure. Similarly, if required, the main system controller can monitor the health of the spare system controller by, for example, monitoring a heartbeat generated by the spare system controller.

In the event of a main system controller failing, the system is operable to provide system controller "failover", this being the operation whereby the spare system controller takes over the responsibilities of the main system controller. Providing automatic failover of the system controller enables the system controller to become highly available. This enables remote management of the server in a more reliable manner, whereby remote control and monitoring of the server is still possible, even if the main system controller fails.

Figure 15:
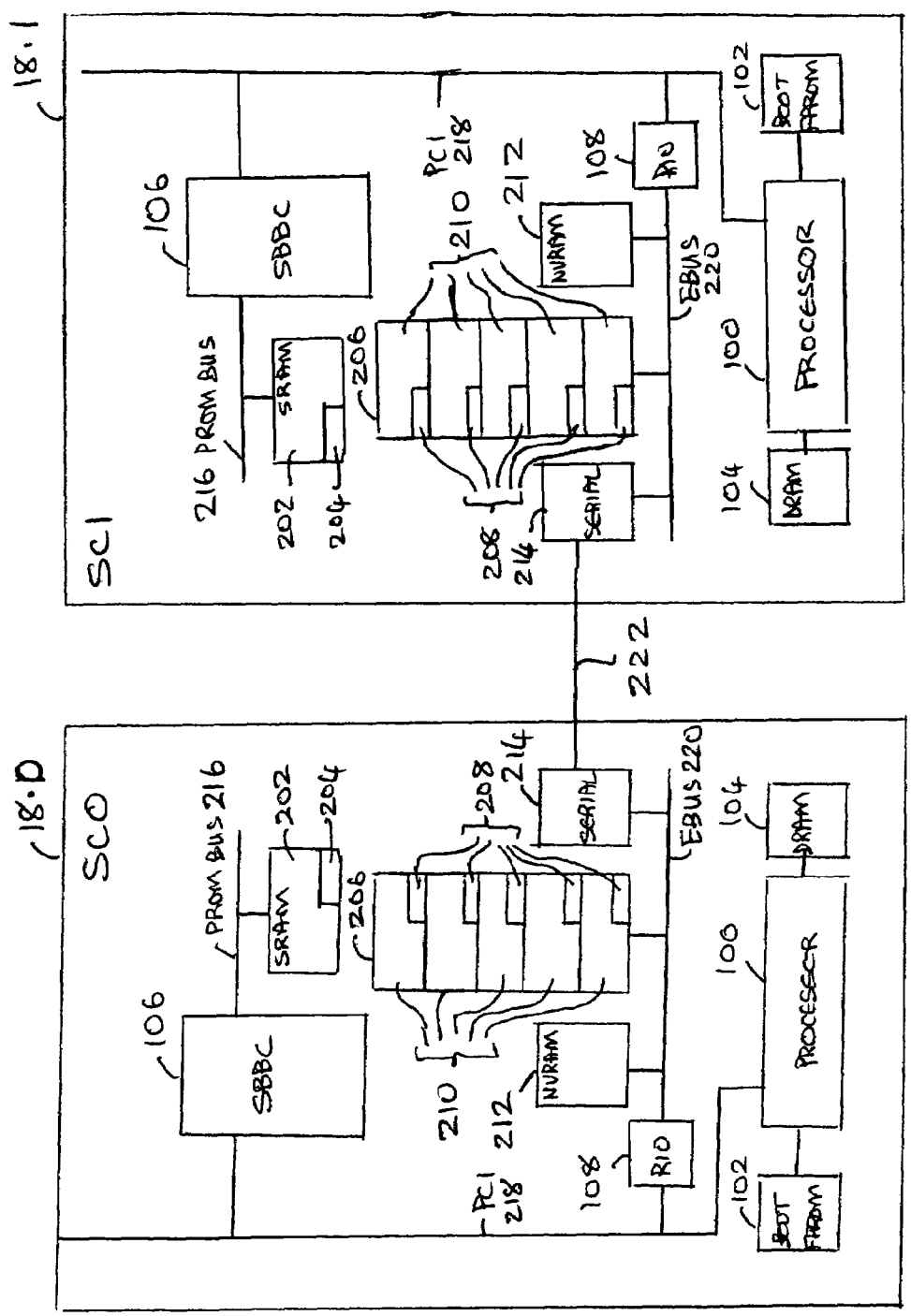

FIG. 15 illustrates selected components of a first system controller (SC0) 18.0, and a second system controller (SC1) 18.1. It is assumed in the following description that the first system controller SC0 is operating as the main system controller and that the second system controller SC1 forms the spare system controller. Only selected components of the system controllers 18 are shown in FIG. 15, for ease of explanation.

Thus, for system controller SC0, the processor 100 is connected via a PCI bus 218 and the SBBC 106 to a PROM bus 216. Also connected to the PROM bus 216 is a random access memory implemented at a SRAM 202. This will be described in more detail in the following.

The processor 100 is also connected via the RIO bridge 108 to EBUS 220. Connected to the EBUS 220 are an NVRAM 212, a flash programmable read only memory (FPROM) 206 (this will be described in more detail in the following) and a serial interface 214. The processor 100 is further connected to a boot PROM 102 and to dynamic random access memory (DRAM) 104. It will be appreciated that further components can be connected to the individual buses, for example as illustrated in FIG. 9.

The second system controller 18.1 comprises the same configuration of components as the first system controller 18.0, and accordingly, the individual components will not be described again in detail. However, it will be noted that the serial interfaces 214 of the first and second system controllers 18.0 and 18.1 are interconnected by a serial connection 222.

The serial connection 222 between the first and second system controllers 18.0 and 18.1 forms a private link. In the present example, to communicate via the private link Remote Method Invocation (RMI) is employed. The private link is monitored by the main system controller and it is automatically restarted if required.

In the event that it becomes necessary for the spare system controller 18.1 to take over from the main system controller 18.0, the configuration of the main system controller 18.0 needs to be mirrored to the spare system controller 18.1. Accordingly, various items of configuration information need to be synchronized. These include Non-Volatile Configuration Information (NVCI), which is held in the FPROM 206, the content of the SRAM 202, the network settings held in NVRAM 212 and time skew data. Due to the nature of the storage of the various data in the FPROM, SRAM and NVRAM, different approaches are taken to achieve synchronization.

Firstly, synchronization of NVCI will be described with reference to FIG. 16. One way of describing NVCI is "a hash table stored in a flash PROM". Significant information can be held as part of the NVCI. The NVCI provides information for control of the platform and the monitoring functions of the system controller. This information can be programmed into the main system controller by a platform administrator. Achieving synchronization could involve the transfer of a significant amount of data, if the whole of the NVCI were to be copied from the main system controller 18.0 to the spare system controller 18.1. Accordingly, in an embodiment of the invention, an efficient approach is taken to the organization of the NVCI, to facilitate the synchronization operations.

Accordingly, in an embodiment of the invention, the NVCI is divided into a plurality of domains, with each domain being stored in a respective flash segment within the FPROM 206. In one example, a domain can be allocated to the overall system platform, represented at 122 in FIG. 12, and four domains being allocated to each of the respective processor domains A, B, C and D, represented at 124 in FIG. 12.

In an embodiment of the invention, a check code, for example in the form of a pseudo-cyclic redundancy code (pseudoCRC) is used for each segment, of the main. The hash table data stored in the FPROM is in the form of key/value pairs, each of which is provided with a 32 bit CRC. The pseudoCRC is formed by an exclusive OR (XOR) operation on the 32 bit CRCs of each key/value pair. Using this approach, the same entropy is achieved as a simple 32 bit CRC, without being dependent on the order in which the key/value pairs are stored in a segment of the FPROM 206. This approach is also efficient when a key/value pair is modified, because the operation to remove the key/value pair from the pseudoCRC is a further XOR operation, since $A \oplus B \oplus B = A$.

The above approach advantageously takes account of a flash PROM, whereby it is not possible to erase a single byte, but merely a complete segment. Moreover, as indicated above, the order of storage of the key/value pairs within a segment does not effect the pseudoCRC generation, whereby two identical hash tables can be stored differently in the respective FPROMs 206 of the system controllers SC0 and SC1.

Returning to FIG. 15, the five domains referred to above are identified at 210, with the pseudoCRCs 208 being stored in the appropriate domain segment. The pseudoCRC 208 could, alternatively, be stored separately from the domains concerned, for example in the DRAM 104, or in specific processor registers (not shown).

When system controller failover is initialized, the NVCI pseudoCRC for the respective domain segments of the first and second system controllers 18.0 and 18.1 can be compared, and a mask can be created where a bit holds the result of the comparison of the pairs of NVCI domains. In the present example, if the mask is equal to zero, this means that the NVCI domain segment concerned is already synchronized. Alternatively, if the mask value is not equal to zero, then this means that there is a difference between the pseudoCRCs for the respective domain, and the NVCI for the domain concerned can be synchronized by, for example, copying from one NVCI domain to a corresponding NVCI domain.

Figure 16:
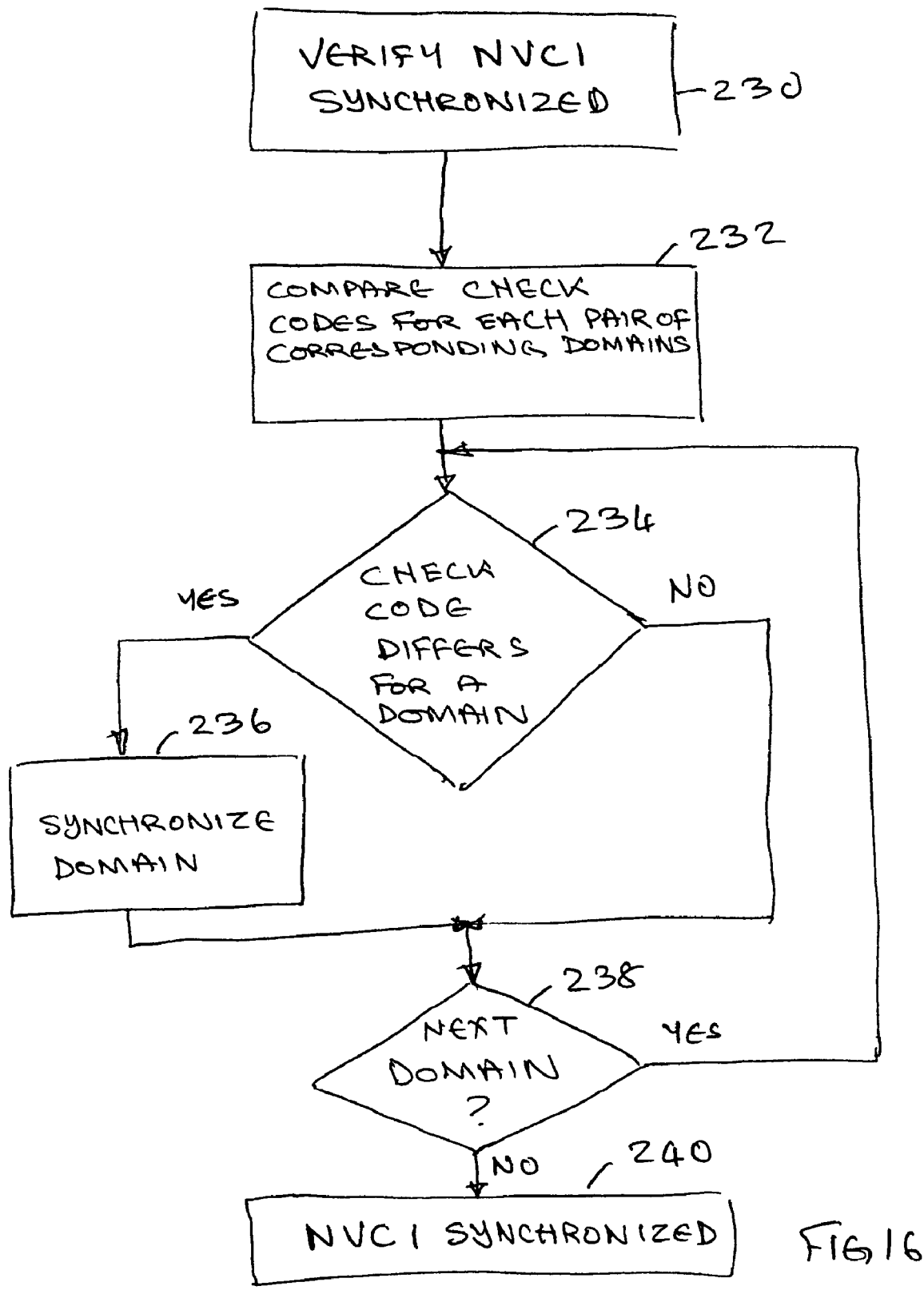
FIG. 16 is a flow diagram representing an example of the verification of non-volatile configuration information.

This is described in more detail in FIG. 16. Accordingly, in step 230, the process of verifying NVCI synchronization is initiated. In step 232, a loop is commenced to compare the check codes of each pair of corresponding domain segments. In step 234, if check codes in the first and second system controllers differ for a given domain, then in step 236, the domain concerned can be synchronized, for example by copying the NVCI of that domain from the one system controller to the other system controller. Otherwise, or following synchronization, at step 238 it is determined whether the check codes need to be checked for another domain. If so, control returns to step 234, otherwise, at step 240, it is determined that the NVCI is synchronized between the main and spare system controller.

As described above, this process can be performed as part of the system controller failover operation. However, it could be performed at other times, merely to confirm synchronization of the NVCI, for example, at initial system boot, or in response to a predetermined event, or at predetermined time intervals.

As indicated above, in the event of a discrepancy between the main and spare NVCI for a domain, the NVCI for a valid domain can be copied from the one to the other of the system controllers. Before this is done, a process could be initiated to determine which NVCI domain contained the correct information. For example, as a result of such an evaluation, it might be determined that the NVCI of the domain of the main system controller was faulty and the NVCI stored in the domain of the spare system controller was valid. If this is determined as a part of a failover operation, then no copy of the domain need be made from the main to the spare system controller, and the NVCI already stored in the domain segment of the spare system controller could then be used.

One such process to determine which NVCI domain contained the correct information could employ the following. Namely, the five pseudoCRCs can also be stored in the NVRAM 212. Then, at boot time, when the NVCI is loaded from flash memory, the pseudoCRCs can be recomputed and compared against the value stored in the NVRAM 212. The result of this comparison can be saved because, later, in the event of a mismatch, this can be used to check which of the domains contained the valid NVCI. Accordingly, this comparison and this information can be used to determine which set of NVCI information is correct, to avoid copying data from a bad system controller.

In the present example, the SRAM 202 can be of the order of, for example, 128 Kbytes, but only a small portion thereof is used. Moreover, when each system controller processor 100 stores information is its respective SRAM 202, it can be arranged to increment a counter 204 indicative of the modification of the SRAM. This counter 204 can be stored as an integer in the SRAM. Alternatively, it could be stored elsewhere, for example in a processor register. Accordingly, in order to verify synchronization of the SRAMs 202 in the respective service controllers 18.0 and 18.1, the single integer formed by the count 204 can simply be compared.

At cold boot time, the complete SRAM 202 is copied from the main system controller 18.0 to the spare system controller 18.1. Accordingly, following a cold boot, the SRAM 202 contents are the same in the two system controllers 18.0 and 18.1, and the count 204 can be used to indicate any subsequent changes made to the SRAM contents.

Figure 17:
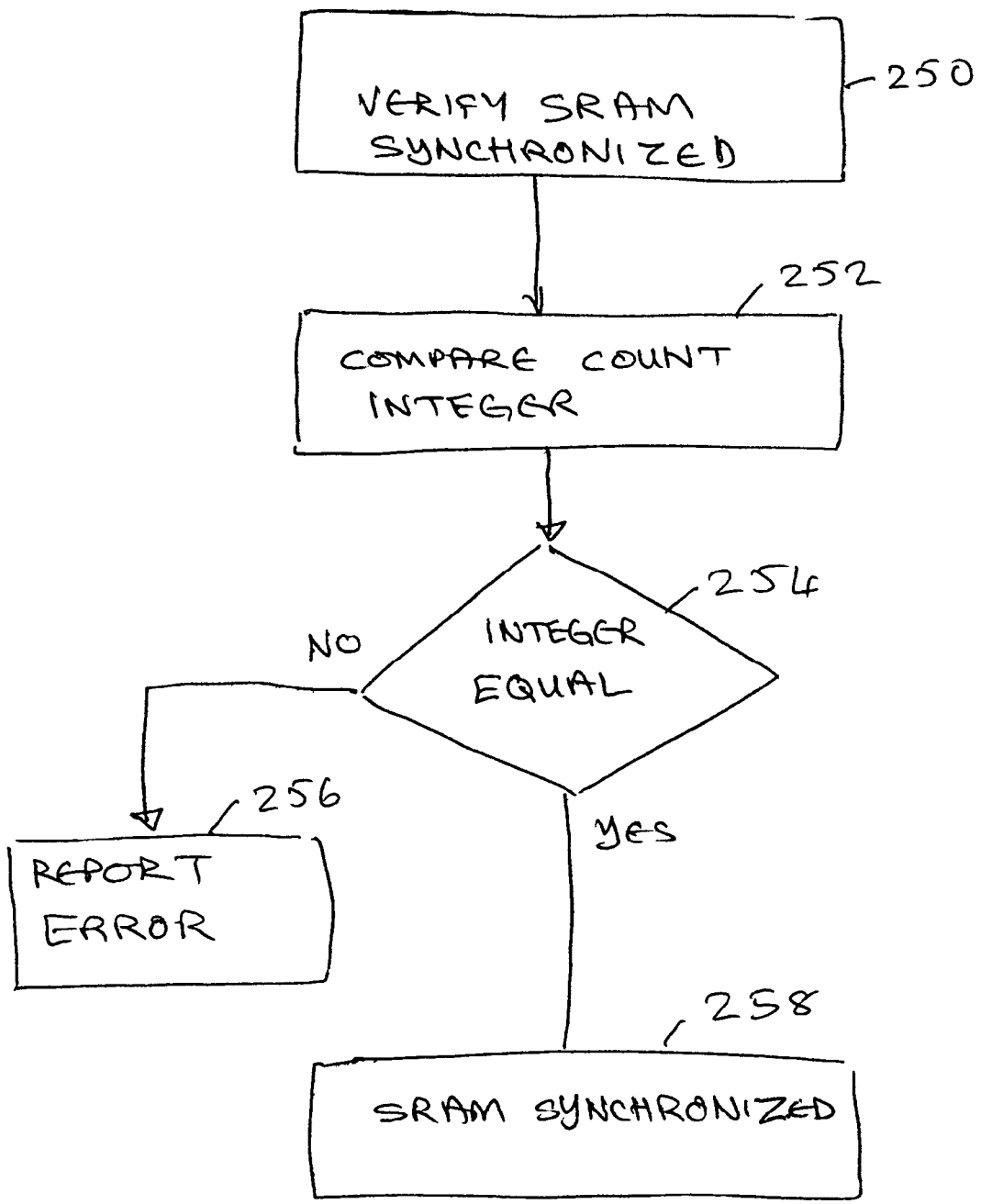
FIG. 17 is a flow diagram representing an example of verifying synchronization of an SRAM.

FIG. 17 illustrates an example of a process for verifying SRAM synchronization. At step 250, the SRAM synchronization process is commenced. At step 252, the count integer 204 from the respective SRAMs 202 of the first and second system controllers 18.0 and 18.1 is compared. A failed update to the SRAM can also trigger a full resynchronization.

If, at step 254, it is determined that the integer is equal, then it is concluded at step 258 that the SRAM is synchronized. Alternatively, at step 256, an error is reported, and remedial action can be taken. The remedial action can be automated, by copying SRAM from the main system controller 18.0 the spare system controller 18.1, subject to it being confirmed that the content of the SRAM 202 of the main system controller 18.1 is correct. Typically, this will be performed as a manual reset (cold boot) operation.

Network settings are stored in the NVRAM 212 in the present implementation. However, the network settings are duplicated in the NVCI stored in the PROM 206. Accordingly, the network settings are therefore automatically mirrored on the main system controller 18.0 and the spare system controller 18.1.

At boot time, the main system controller 18.0 compares its current network settings with the ones stored in the NVCI. If there is a mismatch, it restores the old settings and prints a message to the user requesting a re-boot of the system controller to get the new settings active. This check is only done when the comparison of the NVCI pseudoCRC was bad at boot time since this situation can only happen when NVCI and NVRAM pseudoCRCs do not match. Effectively, this relates to the detection of a new system controller being plugged into the system, or where a user removes or stops the NVCI flash PROM and/or the NVRAM. A platform, or chassis, serial number, or ID, can be stored in the NVRAM, and this can be used as a way of identifying when a system controller has been replaced. Accordingly, restoring the network settings is only done when a system controller is replaced, or where the NVRAM is erased or corrupted.

Figure 18:
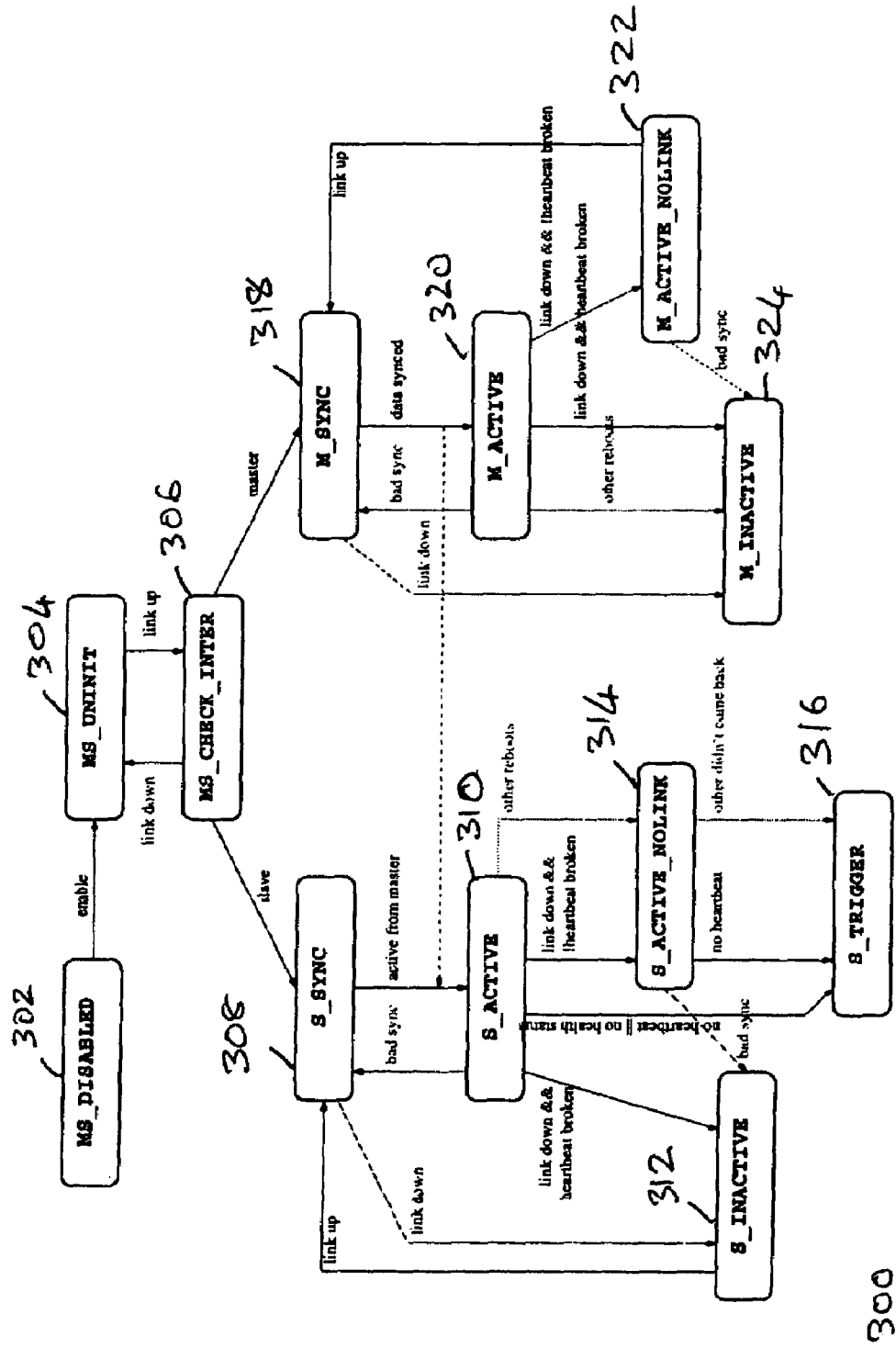
FIG. 18 is a schematic representation of a state diagram for controlling failover operation.

FIG. 18 is a schematic representation of a state machine controlling a failover operation. As represented in FIG. 18, there are only a limited number of possible states.

State 302 represents the main/spare failover being disabled. State 304 represents the main/spare being uninitialized. State 306 represents the main/spare negotiating an interface level. State 318 represents the main system controller carrying out synchronization. State 320 represents the main system controller having fail-over operation enabled and active. State 322 represents the main service controller having failover enabled and active, but with a link between the main and spare system controllers being down. State 324 represents the main system controller having failover enabled, but not active. State 308 represents the spare system controller being in synchronization. State 310 represents the spare system controller having failover enabled and active. State 314 represents the spare system controller having failover enabled and active, but with the link to the main system controller being down. State 312 represents the spare system controller having failover enabled, but not being active. State 316 represents the spare system controller triggering failover.

In normal operation, both system controllers should follow the following path:

MAIN:
    MS_UNINIT→MS_CHECK_INTER→M_SYNC→M_ACTIVE

SPARE:
    MS_UNINIT→MS_CHECK_INTER→S.SYNC→S_ACTIVE

Special cases can occur when the private link is down, or when there is a data-sink error. The data-sink error is handled by going back to the M/S_SYNC case to recheck and to perform synchronization again. Where the private link is down, and failover was active, the system transitions to the ACTIVE_NOLINK state. The spare system controller will continue to monitor a heartbeat coming from the main system controller. If the heartbeat ceases, the spare will take over. The main system controller will stay in the M_ACTIVE_NOLINK until some configuration is changed. As soon as something is changed, the main system controller will recognize that it is no longer in synchronization, and therefore will got the M_INACTIVE state. If the main system controller were in the M_ACTIVE_NOLINK state, and it is detected that the system is no healthy, the spare would be asked to take over by stopping the heartbeat generation.

Although the embodiments above have been described in considerable detail, numerous variations and modifications will become apparent to those skilled in the art once the above disclosure is fully appreciated. It is intended that the following claims be interpreted to embrace all such variations and modifications.

For example although specific implementations have been described in a system employing a Solaris operating system and a PowerOn Self Test Utility, it will be appreciated that the invention is applicable to systems operating under other operating systems and system boot utilities.

Also, it will be appreciated that program products can be employed to provide at least part of the functionality of the present invention and that such program products could be provided on a suitable carrier medium. Such a carrier medium can include, by way of example only, a storage medium such as a magnetic, opto-magnetic or optical medium, etc., or a transmission medium such as a wireless or wired transmission medium or signal, etc.

What is claimed is:

1. A computer system comprising:
a first system controller operable to monitor system operation, the first system controller having first storage associated therewith and being operable to maintain system parameters therein;
a second system controller operable as a spare for the first system controller, the second system controller having second storage associated therewith and being operable to maintain system parameters therein;
wherein at least a predetermined part of each of the first and second storage comprises a plurality of domains, wherein each of the plurality of domains of the first storage corresponds to one of the plurality of domains of the second storage;
wherein a check code is generated for each of the plurality of domains of the first storage and the second storage;
wherein the check code for each of the plurality of domains of the first storage is compared to the check code for the corresponding domain of the second storage to determine whether the corresponding domains are synchronized;

wherein the predetermined part of each of the first and second storage comprises a respective storage device; and wherein each of the respective storage devices comprises a flash programmable read only memory.

2. The computer system of claim 1, configured to synchronize the corresponding domains in the first and second storage if the corresponding check codes are not equivalent.

3. The computer system of claim 1, wherein the predetermined part of each of the first and second storage holds non-volatile configuration information.

4. The computer system of claim 3, wherein the non-volatile configuration information comprises sequential key/value pairs for a hash table.

5. The computer system of claim 1, wherein, in addition to the predetermined part, each of the first and second storage comprises a non-volatile memory part, that is synchronized in its entirety when required.

6. The computer system of claim 1, wherein, in addition to the predetermined part, each of the first and second storage comprises a random access memory part, each of the first and second system controllers maintaining a count of each time that the random access memory part of the first and second storage is updated, the respective counts being compared to confirm synchronization between the random access memory parts.

7. The computer system of claim 1, wherein the check code is a pseudo cyclic redundancy code.

8. The computer system of claim 1, wherein the predetermined part of each of the first and second storage is divided into a first domain for a system platform and a further domain for each operating instance supported on the system platform.

9. The computer system of claim 1, wherein the predetermined part of each of the first and second storage is divided into five domains for a system platform and four domains for respective operating instances.

10. The computer system of claim 1, wherein the check code is held in the domain concerned.

11. The computer system of claim 1, wherein the computer system is a computer server comprising at least one system processor.

12. A method of operating a computer system including a first system controller operable to monitor system operation, the first system controller having first storage associated therewith and being operable to maintain system parameters therein, and a second system controller operable as a spare for the first system controller, the second system controller having second storage associated therewith and being operable to maintain system parameters therein, the method comprising:

dividing at least a predetermined part of each of the first and second storage into a plurality of domains, wherein each of the plurality of domains of the first storage corresponds to one of the plurality of domains of the second storage;

computing a check code for each of the plurality of domains of the first storage and the second storage; and comparing the check code for each of the plurality of domains of the first storage to the check code for the corresponding domain of the second storage to determine whether the corresponding domains are synchronized;

wherein the predetermined part of each of the first and second storage comprises a respective storage device; and wherein each of the respective storage devices comprises a flash programmable read only memory.

13. The method of claim 12, further comprising, where as a result of the comparison a mismatch of corresponding check codes is identified, synchronizing the domain corresponding thereto in the first and second storage.

14. The method of claim 12, wherein the predetermined part of each of the first and second storage holds non-volatile configuration information.

15. The method of claim 14, wherein the non-volatile configuration information comprises sequential key/value pairs for a hash table.

16. The method of claim 12, wherein the check code is a pseudo cyclic redundancy code.

17. The method of claim 12, comprising dividing the predetermined part of each of the first and second storage into a first domain for a system platform and a further domain for each operating instance supported on the system platform.

18. The method of claim 12, comprising dividing the predetermined part of each of the first and second storage into five domains for a system platform and four domains for respective operating instances.

19. The method of claim 12, wherein the computer system is a computer server comprising at least one system processor.

20. The method of claim 12, wherein, the first system controller operates as a main system controller during normal operation and wherein, in the event of the first system controller failing, the second system controller takes over as the main system controller.

21. A computer system comprising:

a first system controller operable to monitor system operation, the first system controller having first storage associated therewith and being operable to maintain system parameters therein;

a second system controller operable as a spare for the first system controller, the second system controller having second storage associated therewith and being operable to maintain system parameters therein;

wherein at least a predetermined part of each of the first and second storage comprises a plurality of domains, wherein each of the plurality of domains of the first storage corresponds to one of the plurality of domains of the second storage;

wherein a check code is generated for each of the plurality of domains of the first storage and the second storage;

wherein the check code for each of the plurality of domains of the first storage is compared to the check code for the corresponding domain of the second storage to determine whether the corresponding domains are synchronized; and wherein the predetermined part of each of the first and second storage is divided into a first domain for a system platform and a further domain for each operating instance supported on the system platform.

22. A computer system comprising:

a first system controller operable to monitor system operation, the first system controller having first storage associated therewith and being operable to maintain system parameters therein;

a second system controller operable as a spare for the first system controller, the second system controller having second storage associated therewith and being operable to maintain system parameters therein;

wherein at least a predetermined part of each of the first and second storage comprises a plurality of domains, wherein each of the plurality of domains of the first storage corresponds to one of the plurality of domains of the second storage;

wherein a check code is generated for each of the plurality of domains of the first storage and the second storage;

wherein the check code for each of the plurality of domains of the first storage is compared to the check code for the corresponding domain of the second storage to determine whether the corresponding domains are synchronized; and wherein the predetermined part of each of the first and second storage is divided into five domains for a system platform and four domains for respective operating instances.

23. A computer system comprising:

a first system controller operable to monitor system operation, the first system controller having first storage associated therewith and being operable to maintain system parameters therein;

a second system controller operable as a spare for the first system controller, the second system controller having second storage associated therewith and being operable to maintain system parameters therein;

wherein at least a predetermined part of each of the first and second storage comprises a plurality of domains, wherein each of the plurality of domains of the first storage corresponds to one of the plurality of domains of the second storage;

wherein a check code is generated for each of the plurality of domains of the first storage and the second storage;

wherein the check code for each of the plurality of domains of the first storage is compared to the check code for the corresponding domain of the second storage to determine whether the corresponding domains are synchronized; and wherein the check code is held in the domain concerned.

24. A method of operating a computer system including a first system controller operable to monitor system operation, the first system controller having first storage associated therewith and being operable to maintain system parameters therein, and a second system controller operable as a spare for the first system controller, the second system controller having second storage associated therewith and being operable to maintain system parameters therein, the method comprising:

dividing at least a predetermined part of each of the first and second storage into a plurality of domains, wherein each of the plurality of domains of the first storage corresponds to one of the plurality of domains of the second storage;

computing a check code for each of the plurality of domains of the first storage and the second storage; and comparing the check code for each of the plurality of domains of the first storage to the check code for the corresponding domain of the second storage to determine whether the corresponding domains are synchronized;

wherein the predetermined part of each of the first and second storage comprises a respective storage device; and wherein, in addition to the predetermined part, each of the first and second storage comprises a non-volatile memory part, the method further comprising synchronizing the non-volatile memory part in its entirety when required.

25. A method of operating a computer system including a first system controller operable to monitor system operation, the first system controller having first storage associated therewith and being operable to maintain system parameters therein, and a second system controller operable as a spare for the first system controller, the second system controller having second storage associated therewith and being operable to maintain system parameters therein, the method comprising:

dividing at least a predetermined part of each of the first and second storage into a plurality of domains, wherein each of the plurality of domains of the first storage corresponds to one of the plurality of domains of the second storage;

computing a check code for each of the plurality of domains of the first storage and the second storage; and comparing the check code for each of the plurality of domains of the first storage to the check code for the corresponding domain of the second storage to determine whether the corresponding domains are synchronized;

wherein the predetermined part of each of the first and second storage comprises a respective storage device; and wherein, in addition to the predetermined part, each of the first and second storage comprises a random access memory part, each of the first and second system controllers maintaining a count of each time that the random access memory part of the first and second storage is updated, the method further comprising comparing the respective counts to confirm synchronization between the random access memory parts.

* * * * *